US011901949B2

(12) United States Patent
Ataie

(10) Patent No.: US 11,901,949 B2
(45) Date of Patent: Feb. 13, 2024

(54) METHOD AND SYSTEM FOR PERFORMING SIGNAL ANALYSIS USING A HYBRID PHOTONIC-ELECTRONIC PROCESSOR

(71) Applicant: Raytheon Company, Waltham, MA (US)

(72) Inventor: Vahid Ataie, San Diego, CA (US)

(73) Assignee: Raytheon Company, Tewksbury, MA (US)

(\*) Notice: Subject to any disclaimer, the term of this patent is extended or adjusted under 35 U.S.C. 154(b) by 0 days.

(21) Appl. No.: 18/068,921

(22) Filed: Dec. 20, 2022

(65) Prior Publication Data

US 2023/0122489 A1    Apr. 20, 2023

Related U.S. Application Data

(63) Continuation of application No. 17/681,623, filed on Feb. 25, 2022, now Pat. No. 11,575,447.

(60) Provisional application No. 63/154,506, filed on Feb. 26, 2021.

(51) Int. Cl.
| | | |
|---|---|---|
| *H04B 10/54* | (2013.01) | |
| *H04B 10/556* | (2013.01) | |
| *H04B 10/50* | (2013.01) | |

(52) U.S. Cl.
CPC ......... *H04B 10/541* (2013.01); *H04B 10/503* (2013.01); *H04B 10/556* (2013.01)

(58) Field of Classification Search
CPC .. H04B 10/541; H04B 10/503; H04B 10/556; H04B 10/00; H04B 2210/006
USPC ....................................................... 398/186
See application file for complete search history.

(56) References Cited

U.S. PATENT DOCUMENTS

| | | | |
|---|---|---|---|
| 8,026,837 B1 | 9/2011 | Valley et al. | |
| 8,446,305 B1 | 5/2013 | Zanoni et al. | |
| 8,779,955 B1* | 7/2014 | Zanoni ..................... | G02F 7/00 341/137 |
| 8,965,211 B1* | 2/2015 | Zanoni ................... | H04B 10/61 398/208 |
| 10,763,971 B2* | 9/2020 | Esman ................... | H04B 10/90 |
| 11,137,627 B2* | 10/2021 | Ataie ................. | G01B 9/02002 |

(Continued)

FOREIGN PATENT DOCUMENTS

| | | | |
|---|---|---|---|
| CN | 109039465 A | | 12/2018 |
| CN | 113872700 A | * | 12/2021 |
| CN | 113872700 A | | 12/2021 |

*Primary Examiner* — Abbas H Alagheband

(57) ABSTRACT

An apparatus for generating a time-delayed product of two independent signals includes a fixed-wavelength laser. A first optical modulator is optically coupled to the fixed-wavelength laser and configured to modulate a fixed wavelength optical carrier with a first input signal of a set of input signals. The apparatus also includes a tunable laser. A second optical modulator is optically coupled to the tunable laser and configured to modulate a tunable optical carrier with a second input signal of the set of input signals. The apparatus also includes a dispersive element coupled to the second optical modulator, a first optical detector coupled to the dispersive element, a third optical modulator optically coupled to the first optical detector and the first optical modulator, an optical 90-degree hybrid element optically coupled to the third optical modulator, and a plurality of optical detectors optically coupled to the optical 90-degree hybrid element.

20 Claims, 15 Drawing Sheets

(56) References Cited

U.S. PATENT DOCUMENTS

| | | | |
|---|---|---|---|
| 11,397,075 B2 | 7/2022 | Swanson et al. | |
| 2013/0328706 A1* | 12/2013 | Marom | H03M 1/1245 |
| | | | 341/137 |
| 2014/0320346 A1 | 10/2014 | Caille et al. | |
| 2019/0339548 A1* | 11/2019 | Ataie | G02F 1/0102 |
| 2020/0112378 A1 | 4/2020 | Holzheimer et al. | |
| 2020/0300695 A1* | 9/2020 | Nahmias | G01J 1/0437 |

\* cited by examiner

METHOD AND SYSTEM FOR PERFORMING SIGNAL ANALYSIS USING A HYBRID PHOTONIC-ELECTRONIC PROCESSOR

CROSS-REFERENCE TO RELATED APPLICATIONS AND PRIORITY CLAIM

This application claims priority under 35 U.S.C. § 120 as a continuation of U.S. patent application Ser. No. 17/681,623 filed on Feb. 25, 2022, which claims priority under 35 U.S.C. § 119(e) to U.S. Provisional Patent Application No. 63/154,506 filed Feb. 26, 2021. Both of these applications are hereby incorporated by reference in their entirety for all purposes.

The following regular U.S. patent applications (including this one) are being filed concurrently, and the entire disclosure of the other application is incorporated by reference into this application for all purposes:

Application Ser. No. 17/681,623 filed Feb. 25, 2022, entitled "METHOD AND SYSTEM FOR PERFORMING SIGNAL ANALYSIS USING A HYBRID PHOTONIC-ELECTRONIC PROCESSOR;" and Application Ser. No. 17/681,629 filed Feb. 25, 2022, entitled "METHOD AND SYSTEM FOR PERFORMING SIGNAL ANALYSIS USING A CORRELATIVE RECEIVER."

BACKGROUND OF THE INVENTION

Real-time signal analysis is strictly dictated by the waveform bandwidth. Current electronic processors allow for complex analysis for signals with bandwidth smaller than 1 GHz. Examples of currently viable real-time electronic processing include Fourier and Hilbert transforms, correlation, convolution, pattern matching, and cyclostationary analysis. To perform any of these, a physical signal must first be digitized, mandating the use of an analog-to-digital (ADC) convertor processor in the front-end. While a number of applications can be served by sub-GHz signal analysis, a number of important applications require real-time analysis of signals with bandwidth exceeding 1 GHz.

With the emergence of high-capacity wireless communications, spectral analysis of wideband radio-frequency signals, associated with military applications in the past, has emerged as one of the most important applications. Current 5G wireless infrastructure incorporates signaling in excess of 1 GHz, requiring real-time spectral analysis for the purposes of provisioning, network surveillance, security and traffic conflict resolution. In electronic warfare, higher-order spectral analysis of the contiguous radio-frequency (RF) band (e.g., 1 kHz-110 GHz) is dictated by a need to identify, intercept and geolocate any emitter and classify its operation. In light wave (e.g., fiber optic) communication, it is necessary to analyze channels with aggregate capacity exceeding 400 Gbit/sec in order to provide real-time security and reverse transmission penalties. Current electronic processors possess neither the precision nor speed to satisfy these applications, causing a need for improved methods and systems that can address analysis of wideband signals.

SUMMARY OF THE INVENTION

In accordance with various aspects of the present disclosure, apparatuses and methods for wideband signal analysis using hybrid photonic-electronic processing are provided.

According to various aspects, there is provided an apparatus for generating a time-delayed product of two independent signals.

One embodiment includes an apparatus comprising: a fixed-wavelength laser operable to provide a fixed wavelength optical carrier; a first optical modulator optically coupled to the fixed-wavelength laser and configured to modulate the fixed wavelength optical carrier with a first input signal of a set of input signals; a tunable laser operable to provide a tunable optical carrier; a second optical modulator optically coupled to the tunable laser and configured to modulate the tunable optical carrier with a second input signal of the set of input signals; a dispersive element coupled to the second optical modulator; a first optical detector coupled to the dispersive element; a third optical modulator optically coupled to the first optical detector and the first optical modulator; an optical 90-degree hybrid element optically coupled to the third optical modulator; and a plurality of optical detectors optically coupled to the optical 90-degree hybrid element and configured to convert outputs of the optical 90-degree hybrid element into electrical signals.

Another embodiment includes an apparatus comprising: an optical source operable to provide a frequency comb including a plurality of optical carriers; a first optical modulator optically coupled to the optical source and electrically coupled to a first antenna operable to receive a first input signal of a set of input signals; a tunable laser operable to provide a tunable optical carrier; a second optical modulator optically coupled to the tunable laser and electrically coupled to a second antenna operable to receive a second input signal of the set of input signals; a dispersive element optically coupled to the second optical modulator; a first optical detector optically coupled to the dispersive element; a third optical modulator optically coupled to the first optical modulator and electrically coupled to the first optical detector; a wavelength-division demultiplexer optically coupled to the third optical modulator and the optical source; a plurality of optical 90-degree hybrid elements, each of the plurality of optical 90-degree hybrid elements being coupled to the wavelength-division demultiplexer; a plurality of optical detectors, each of the plurality of optical detectors being coupled to an output of one of the plurality of optical 90-degree hybrid elements; and a plurality of analog-to-digital converters, each of the plurality of analog-to-digital converters being electrically coupled to one of the plurality of optical detectors.

Numerous benefits are achieved by way of the present invention over conventional techniques. For example, embodiments of the present invention provide methods and systems for real-time processing of radiofrequency (RF) input signals which may have bandwidth larger than several hundred GHz. These and other embodiments of the invention, along with many of its advantages and features, are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein.

rather, these embodiments are provided by way of illustration only and so that this disclosure will be thorough, complete and will fully convey the full scope to those skilled in the art.

DETAILED DESCRIPTION OF THE INVENTION

The present invention relates generally to wideband signal analysis with a hybrid photonic-electronic processor. More particularly, embodiments of the present invention provide methods and systems that acquire and process high bandwidth signals (e.g., larger than 100 GHz) in real-time. However, embodiments of the present invention are applicable to a variety of wideband signal analysis systems.

Figure 1:
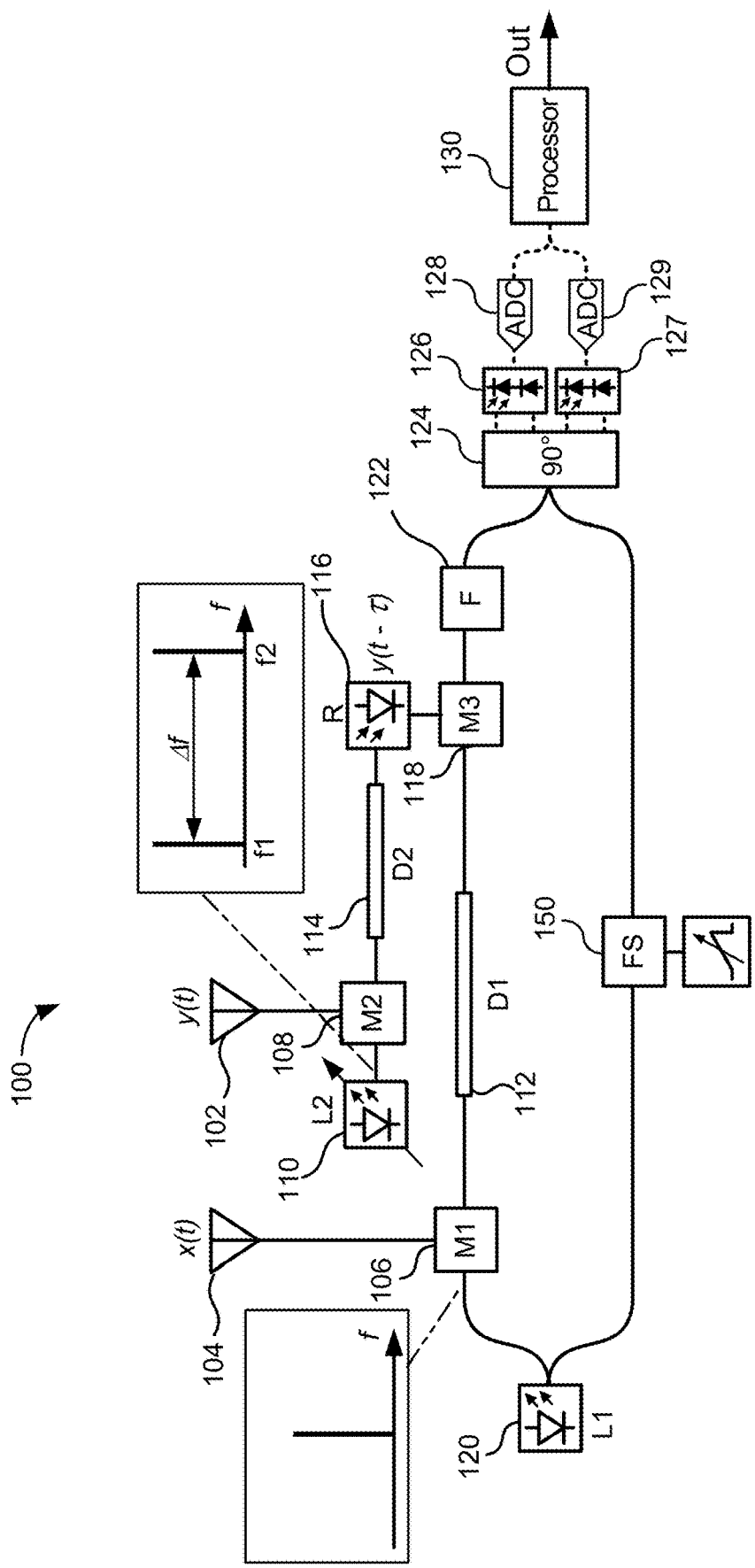
FIG. 1 is a block diagram of a hybrid photonic-electronic processor according to an embodiment of the present invention.

FIG. 1 is a block diagram of a hybrid photonic-electronic processor according to an embodiment of the present invention. The hybrid photonic-electronic processor 100 includes a front end dedicated to acquiring two arbitrary RF signals (e.g., a first RF signal y(t) and a second RF signal x(t)) and performing its operation in the photonic domain before converting the result to digital form and completing the processing chain.

The hybrid photonic-electronic processor 100 may receive radiofrequency (RF) input (e.g., the arbitrary signals x(t) and y(t)) through a first antenna 102 and a second antenna 104. As an example, the first antenna 102 and the second antenna 104 can receive RF signals having a bandwidth up to hundreds of GHz. The hybrid photonic-electronic processor 100 converts the inputs received by the first antenna 102 and second antenna 104 from the RF domain to the optical domain via optoelectronic modulators.

The hybrid photonic-electronic processor 100 includes a first optoelectronic modulator 106, a second optoelectronic modulator 108, and a third optoelectronic modulator 118. The hybrid photonic-electronic processor 100 may further include a tunable laser 110. The output of the tunable laser 110 (e.g., an optical carrier) is provided to the second optoelectronic modulator 108 using a suitable optical connection. As illustrated in FIG. 1, the tunable laser 110 is capable of tuning its center frequency over a frequency range $\Delta f$ that ranges from $f_1$ to $f_2$. The RF input y(t) of the second antenna 104 modulates the optical carrier generated by the tunable laser 110 via the second optoelectronic modulator 108, converting the RF input y(t) from the RF domain to the optical domain.

Referring to FIG. 1, a delay $\tau$ in the first RF signal y(t) is generated by transmitting the modulated optical carrier produced at the output of the second optoelectronic modulator 108 over a second dispersive line 114. The relative delay $\tau$ between modulated carriers, centered at $f_1$ and $f_2$ and separated by $\Delta f$ is defined by $\tau = D \times L \times c \times \Delta f/f^2$, where D is the dispersion of the second dispersive line 114, L is the length of the second dispersive line 114, c is the speed of light, and f is the frequency. As an example, for a second dispersive line 114 with L=1 km long, conventional dispersion compensating fiber that possesses a dispersion $D=5 \times 10^{-4}$ s/m$^2$ will induce a delay of $\tau=5$ ns when a tunable laser operating at a wavelength of 1550 nm (i.e., a frequency of f=193 THz) is tuned over a frequency range of $\Delta f=1250$ GHz (i.e., 10 nm). The practical delay range of a processor using a fiber as a dispersion line can be limited by the fiber loss $\alpha=0.25$ dB/km and the tunable range of the laser carrier. An acceptable loss (e.g., around 10 dB) and a common tunable range of a 1550 nm laser (i.e. approximately 100 nm) result in a delay range of 2000 ns being achieved.

The delayed signal output (labeled as y(t−$\tau$) in FIG. 1) of the second dispersive line 114 is then sent to a detector element 116, which can be referred to as a first optical detector. The detector element 116 will convert the delayed signal from the optical domain back to the RF domain. Thus, the embodiment illustrated in FIG. 1 utilizes the tunable laser 110, the second optoelectronic modulator 108, the second dispersive line 114, and the detector element 116 (e.g., an intensity detector) to implement a tunable delay line that delays the arbitrary first RF input y(t) to produce delayed signal y(t−$\tau$) used to drive the third optoelectronic modulator 118.

The hybrid photonic-electronic processor 100 may further comprise a fixed-frequency laser 120. The output of the fixed-frequency laser 120 (e.g., a fixed frequency optical carrier) may be split into two portions, with an upper portion as illustrated in FIG. 1 being provided to the first optoelectronic modulator 106 using a suitable optical connection and a lower portion as illustrated in FIG. 1 being provided to a frequency shifter 150. The second RF input x(t) received at the second antenna 104 may be converted from the RF domain to the optical domain by modulating the output of the fixed-frequency laser 120 via the first optoelectronic modulator 106. As a result, the optical signal output by the first optoelectronic modulator 106 carries the second RF input signal x(t). In some embodiments, first optoelectronic modulator 106 is implemented as a dual-port Mach-Zehnder modulator and, in other embodiments, the first optoelectronic modulator 106 is implemented as a dual-port, nested Mach-Zehnder device.

The modulated signal produced by the first optoelectronic modulator 106 is transmitted to the third optoelectronic modulator 118 via the first dispersive line 112. The frequency shifter 150 may be configured to shift the frequency of the fixed-frequency laser 120 by an arbitrary amount. This will act as a local oscillator for the system, and be utilized during detection of the product that will be generated in the upper portion.

In the embodiment illustrated in FIG. 1, the first dispersive line 112 introduces a fixed delay to the optical signal that is received at the third optoelectronic modulator 118. The description provided herein assumes that the first dispersive line 112 is not utilized and that the second dispersive line 114 is designed and implemented in the absence of the first dispersive line 112. Thus, the first dispersive line 112 is not required to implement the processor functionality described herein and is inserted as an option to shift the delay center (e.g., a center frequency around which the hybrid photonic-electronic processor 100 will acquire the signal) associated with the second dispersive line 114, the tuning range of the tunable laser 110, and the first dispersive line 112. Accordingly, use of first dispersive line 112 can enable an increased delay. One of ordinary skill in the art would recognize many variations, modifications, and alternatives.

At the third optoelectronic modulator 118, the output of the detector element 116 (RF signal y(t−τ)) is used as an RF drive input to modulate the second RF input x(t) received at the second antenna 104, resulting in the generation of the multiplication state x(t)×y(t−τ) in the optical domain and residing on an optical carrier at the output of the third optoelectronic modulator 118, which is subsequently filtered using the filtering element 122. Thus, using inputs of the delayed first RF inputs signal y(t−τ) in the optical domain and the second RF input signal x(t) in the optical domain, which is potentially delayed using the first dispersive line 112, the third optoelectronic modulator 118 produces an output equal to the product of x(t)×y(t−τ). As described more fully below, this product is the kernel of the cross-correlation function.

Accordingly, using the hybrid photonic-electronic processor 100 illustrated in FIG. 1, a multiplication state can be generated between two arbitrary RF signals, namely the RF inputs y(t) received at the first antenna 102 and x(t) received at the second antenna 104, and for an arbitrary delay τ between the two arbitrary RF signals, given that the delay τ falls within the ranges defined by the dispersion of the second dispersive line 114 and the tuning range of the tunable laser 110 described above. Specifically, this means that the kernel of the cross-correlation function can be generated at the output of the third optoelectronic modulator 118 in a computation-free manner as shown in equation (1):

$$C(T) = \int_{-\tau}^{\tau} x(t) \times y(t-\tau) dt \quad (1)$$

where −τ<t<τ is the integration interval used to estimate the cross-correlation function. The filtering element 122 can be used to complete the integration in the [−τ, τ] bounds by designing a matching filtering function. The filtering element 122 can be eliminated if the backplane digital processor 130 possesses sufficient memory to complete the integration step. If the output of the hybrid photonic-electronic processor 100 is intended to generate either the product or the delayed product of the inputs received at the first antenna 102 and the second antenna 104, the integration done by the filtering element 122 and/or backplane digital processor 130 may not be utilized. In some embodiments, the backplane digital processor 130 performs a discrete Fourier transform on the output of the ADC elements 128 and 129.

As illustrated in FIG. 1, a coherent detection implementation is used in which a tunable frequency shift is applied by the frequency shifter 150 to the optical carrier generated by fixed-frequency laser 120. This frequency shifted optical carrier is utilized as a local oscillator and combined in a coherent receiver to detect the multiplication state x(t)×y(t−τ).

The output of the third optoelectronic modulator 118 is combined with the optical carrier generated by the fixed-frequency laser 120 and sent to an optical 90-degree hybrid element 124. The optical 90-degree hybrid element 124 is configured to separate quadratures (e.g., an orthogonal decomposition may be performed by the optical 90-degree hybrid element 124 to separate any signal into orthogonal components known as quadratures; an example of such a method is separating the real and imaginary components in base band signals) of the output (optionally filtered using filtering element 122) of the third optoelectronic modulator 118. The output of the optical 90-degree hybrid element 124 is provided to the set of balanced detectors 126 and 127, also referred to as balanced receivers, in order to perform coherent optical-to-electrical conversion. The output of each balanced detector is subsequently digitized by a set of analog-to-digital conversion (ADC) elements 128 and 129 and provided to the backplane digital processor 130. Thus, the hybrid photonic-electronic processor 100 illustrated in FIG. 1 utilizes a direct modulation and direct detection methodology to compute F(x(t)×y(t−τ)) as described more fully herein. As described herein, the signals output by the by the ADCs are combined inside the processor 130 as a complex number, the real part from one ADC and the imaginary part from the other ADC.

Figure 2A:
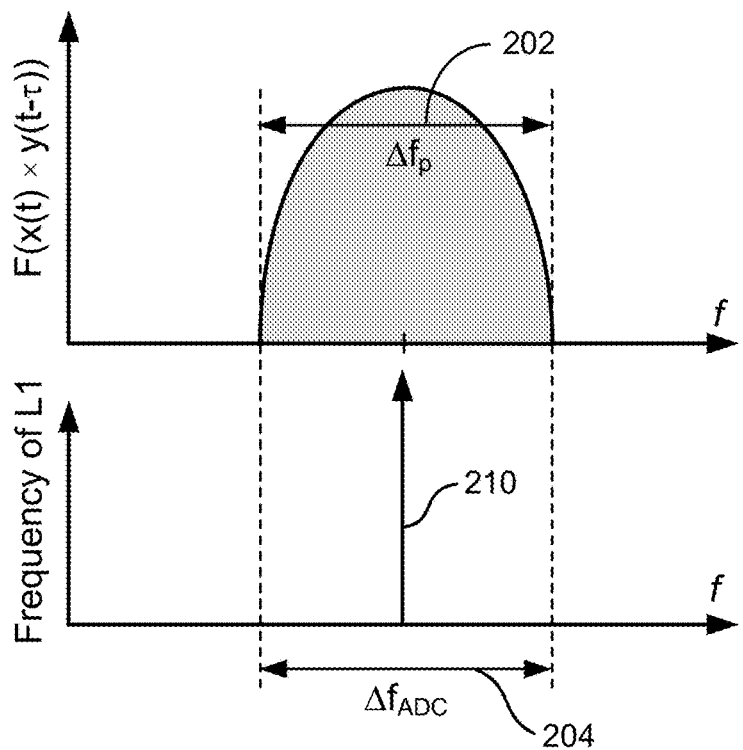
FIG. 2A is a set of plots illustrating a first case, where the bandwidths of the detector and of the ADCs are sufficiently large according to a first embodiment of the present invention.
Figure 2B:
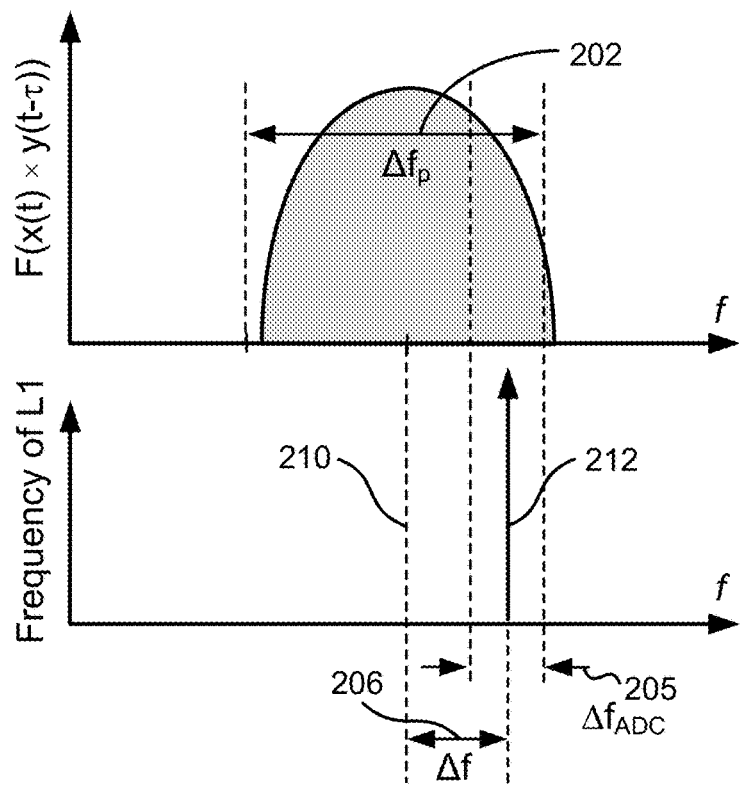
FIG. 2B is a set of plots illustrating a second case, where the bandwidths of the detector and of the ADCs are not sufficiently large according to a second embodiment of the present invention.

FIGS. 2A and 2B illustrate two different conditions defined by the relationship between the detector bandwidth and the bandwidth of the set of ADCs used in the optical-to-electrical conversion stage.

FIG. 2A is a set of plots illustrating a first case, where the bandwidth of the detector and the bandwidth of the ADCs are sufficiently large according to a first embodiment of the present invention. FIG. 2A shows a case where the bandwidth of the detector and the bandwidth $\Delta f_{ADC}$ 204 of the ADC elements 128 and 129 are at least greater than the bandwidth $\Delta f_P$ 202 of the multiplication state of the two inputs received at the first antenna 102 and second antenna 104. The top plot in FIG. 2A is the Fourier transform of the product x(t)×y(t−τ) as a function of frequency. The bandwidth $\Delta f_P$ can also be referred to as the bandwidth of the product in the frequency domain.

In this case, the optical carrier generated by fixed-frequency laser 120, which is illustrated in the lower plot of FIG. 2A, does not need to be frequency shifted by the frequency shifter 150 and is combined with the output of the third optoelectronic modulator 118 as a fixed local oscillator. The bandwidth of the detector and the bandwidth $\Delta f_{ADC}$ of the ADC elements 128 and 129 will typically, at a minimum, be greater than the sum of the bandwidths of the two RF inputs y(t) and x(t) received at the first antenna 102 and the second antenna 104. The ADC elements may then be centered to acquire signals at frequency 210 and the bandwidth $\Delta f_{ADC}$ 204 will be sufficient to detect the complete Fourier transform of the multiplication state $F(x(t) \times y(t-\tau))$, which has a bandwidth $\Delta f_P$ 202.

FIG. 2B is a set of plots illustrating a second case, where the bandwidth of the detector and of the ADCs are not sufficiently large according to a second embodiment of the present invention. FIG. 2B shows how to relax the ADC bandwidth requirements through an example where the detector and the bandwidth $\Delta f_{ADC}$ 205 of the ADC elements 128 and 129 is less than the bandwidth $\Delta f_P$ 202 of the multiplication state of the two inputs received at the first antenna 102 and second antenna 104. The top plot in FIG. 2B is the Fourier transform of the product $x(t) \times y(t-\tau)$ as a function of frequency.

In this case, the optical carrier generated by fixed-frequency laser 120 may be frequency shifted by an arbitrary change in frequency $\Delta f$ 206 created by the frequency shifter 150 and combined with the output of the third optoelectronic modulator 118. This frequency shift $\Delta f$ 206 changes the center of the ADCs acquisition position from, for example, frequency 210 to frequency 212 as is illustrated in the lower plot of FIG. 2B. As a result, the ADC elements 128 and 129 then operate over a bandwidth $\Delta f_{ADC}$ 205 centered on frequency 212. Subsequent steps utilize a different frequency shift provided by the frequency shifter 150 to acquire the entire multiplication state bandwidth $\Delta f_P$ 202. Since, in this example, the bandwidth $\Delta f_P$ 202 of the multiplication state cannot be covered by a single acquisition step of the ADC elements, the frequency shift $\Delta f$ 206 corresponding to the frequency of the fixed-frequency laser 120 is performed a number of times. Specifically, during each acquisition step, a portion of $F(x(t) \times y(t-\tau))$ is acquired over a bandwidth of $\Delta f_{ADC}$ 205, resulting in the acquisition of $F(x(t) \times y(t-\tau))$ in $\Delta f_P / \Delta f_{ADC}$ steps. When the multiplication product is real, its spectrum is symmetric, and so allows the acquisition scan to be halved (i.e., utilizing only $\Delta f_P / \Delta f_{ADC}/2$ steps).

The signal delay arm (e.g., the combination of the second optoelectronic modulator 108, second dispersive line 114, and detector element 116) can be implemented in both coherent and incoherent forms. This type of implementation may be used to reduce distortion at the output, resulting in more accurate calculations of equation (1).

Figure 3:
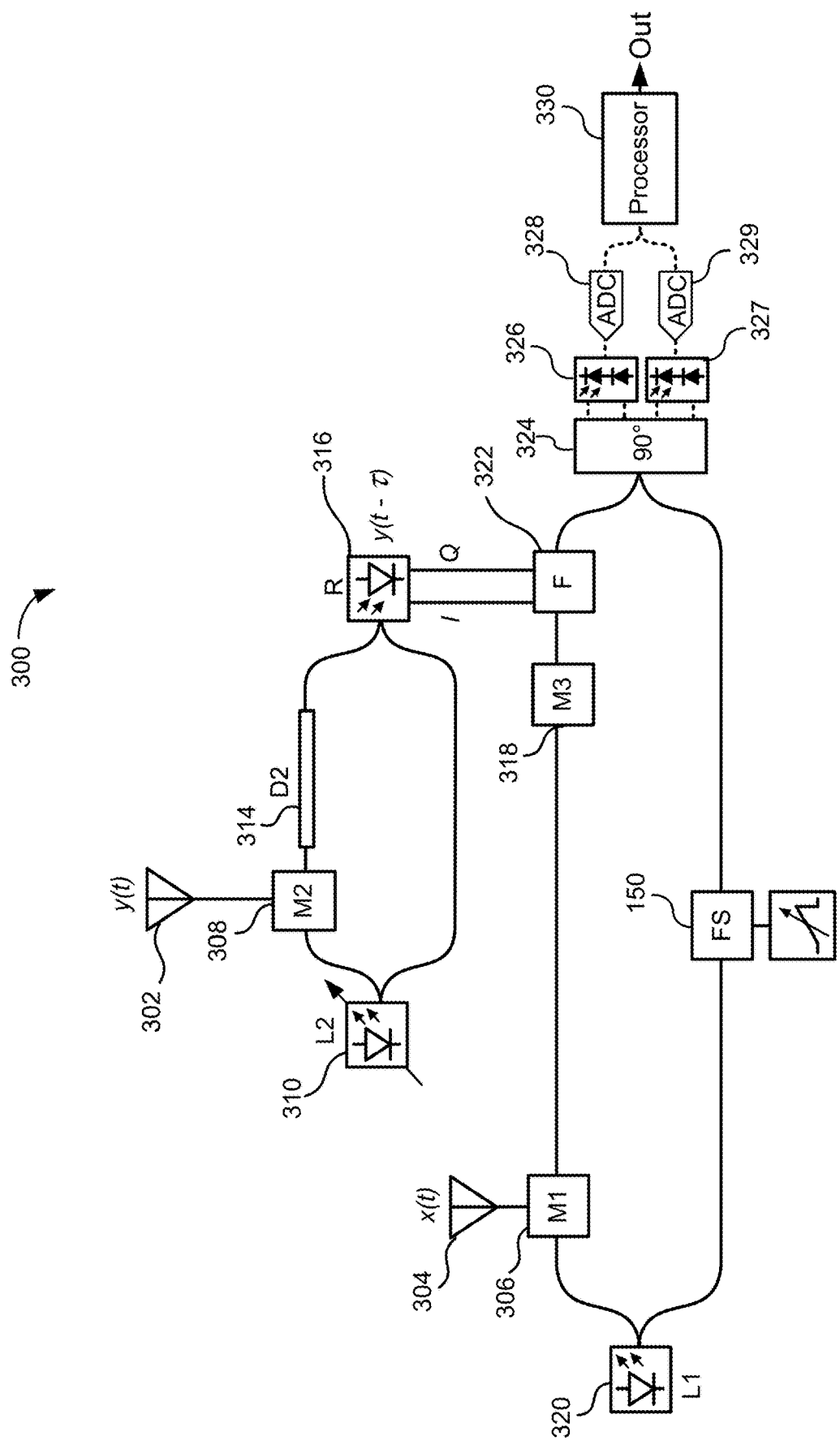
FIG. 3 is a block diagram of an implementation of the delay arm using coherent detection and modulation according to an embodiment of the present invention.

FIG. 3 is a block diagram of an implementation of the signal delay arm using coherent detection and modulation. A coherent modulator term means that a complex (I/Q) RF signal is used to drive the optical modulator to encode both phase and amplitude onto the optical carrier. Thus, in contrast with FIG. 1, which illustrated the use of direct modulation and detection, the embodiment illustrated in FIG. 3 utilizes coherent modulation and detection. The hybrid photonic-electronic processor 300 illustrated in FIG. 3 shares some common elements with the hybrid photonic-electronic processor 100 illustrated in FIG. 1 and the description provided in relation to FIG. 1 is applicable to FIG. 3 as appropriate. Differences in the systems are discussed herein.

The output of the tunable laser 310 is split: the upper portion of the laser output is modulated by the first RF input y(t) received by the first antenna 302 and delayed over the second dispersive line 314; the lower portion of the laser output is not modulated and serves as a local oscillator for a coherent detector 316. Coherent detector 316 generates both quadrature and phase (I/Q) output in order to drive a third coherent optoelectronic modulator 318. Correspondingly, the first coherent optoelectronic modulator 306 is driven by complex (I/Q) RF input x(t) received at the second antenna 304, allowing the third coherent optoelectronic modulator 318 to generate a complex product $x(t) \times y(t-\tau)$ at its output. The first dispersive line 112 illustrated in FIG. 1 has been removed, but may be utilized as discussed previously for optimization.

The output of the third coherent optoelectronic modulator 318 is filtered using filter 322 and is combined with the optical carrier generated by the fixed-frequency laser 320 and sent to an optical 90-degree hybrid element 324. The output of the optical 90-degree hybrid element 324 is provided to the set of balanced detectors 326 and 327, also referred to as balanced receivers, in order to perform coherent optical-to-electrical conversion. The output of each balanced detector is subsequently digitized by a set of analog-to-digital conversion (ADC) elements 328 and 329 and provided to the backplane digital processor 330. Accordingly, the embodiment illustrated in FIG. 3 can utilize coherent techniques to provide an output of processor 330 equal to the cross ambiguity function $R_\alpha^T(\tau)$.

Figure 4:
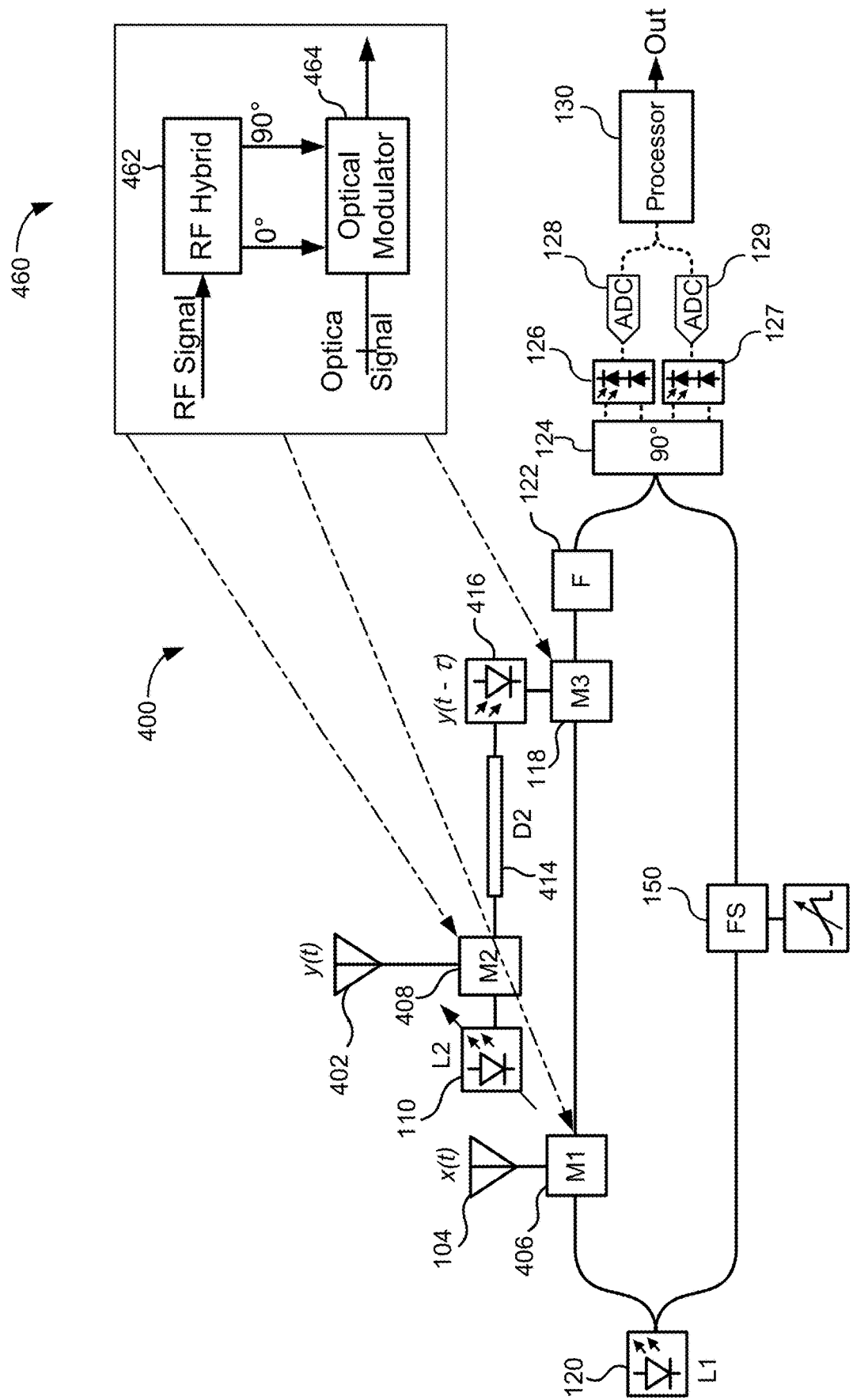
FIG. 4 is a block diagram of an implementation of the delay arm in an incoherent form according to an embodiment of the present invention.

FIG. 4 is a block diagram of an implementation of the delay arm in an incoherent form. The hybrid photonic-electronic processor 400 illustrated in FIG. 4 shares some common elements with the hybrid photonic-electronic processor 100 illustrated in FIG. 1 and the description provided in relation to FIG. 1 is applicable to FIG. 4 as appropriate. Differences in the system are discussed herein.

In this implementation, any optoelectronic modulator may be implemented as a single-sideband optical modulator 460. The single-sideband optical modulator 460 may be implemented by a combination of an optical 90-degree hybrid 462 receiving an RF input and outputting the RF input along with a 90-degree shifted copy, sending it to an optical modulator 464 which further takes an optical signal as an input to be modulated. A first incoherent optoelectronic modulator 408 is driven by the first RF input y(t) received by the first antenna 402 and its 90-degree shifted copy in order to generate a signal-sideband modulated output. In this configuration, the DC component of the modulator output acts as a local oscillator. When received by an incoherent detector element 416, the beating between the local oscillator and the optical sideband generates the original RF signal. In addition to eliminating the need for use of coherent modulators (e.g., the first coherent optoelectronic modulator 306, the second coherent optoelectronic modulator 308, the third coherent optoelectronic modulator 318 as illustrated in FIG. 3) and coherent detector (e.g., the coherent detector 316 as illustrated in FIG. 3), single-sideband modulation also reduces or minimizes distortion imposed by the second dispersive line 414. The hybrid photonic-electronic processor 400 illustrated in FIG. 4 does this reduction in distortion in the front end (e.g., via the first incoherent optoelectronic modulator 408, and the second incoherent optoelectronic modulator 406) as opposed to the hybrid photonic-electronic processor 300 illustrated in FIG. 3 where it is done via the delay arm (e.g., the second coherent optoelectronic modulator 308, the second dispersive line 314, and the coherent detector 316).

Embodiments may use a detector and analog-to-digital converter with a bandwidth that is lower than the bandwidth of the $x(t)y(t-\tau)$ product as illustrated in FIG. 2. The correlation output is generated by assembling consecutive signal acquisitions, defined by the tuning sweep time of the tunable laser (e.g., the tunable laser 110). A more general function shown as equation (2), referred to as the cross-ambiguity function (CAF) $R_\alpha^T(\tau)$, is often sought in spectral analysis:

$$R_\alpha^T(\tau) = \int_{-T/2}^{T/2} x(t) \times y(t-\tau) e^{j2\pi\alpha t} dt \quad (2)$$

where $\alpha$ is defined as the cyclical frequency, following the standard terminology from cyclostationary analysis. Note that the conjugation of one of the inputs leads to the definition shown in equation (3):

$$R_\alpha^T(\tau) = \int_{-T/2}^{T/2} x(t) \times y^*(t-\tau) e^{j2\pi\alpha t} dt. \quad (3)$$

For the purpose of this disclosure, the conjugation of the input signal is assumed as an option, as the front end of the processor can provide both conjugate and non-conjugate versions of the signal, as described later. For the purpose of spectral analysis, it is often useful to work using the Fourier transform of the CAF, defined as the spectral correlation function (SCF). The embodiments illustrated in the figures and described herein generate a two-dimensional CAF and subsequently compute the SCF by a single Fast Fourier Transform (FFT), which is within practical limits for off-the-shelf electronic processors.

Figure 5:
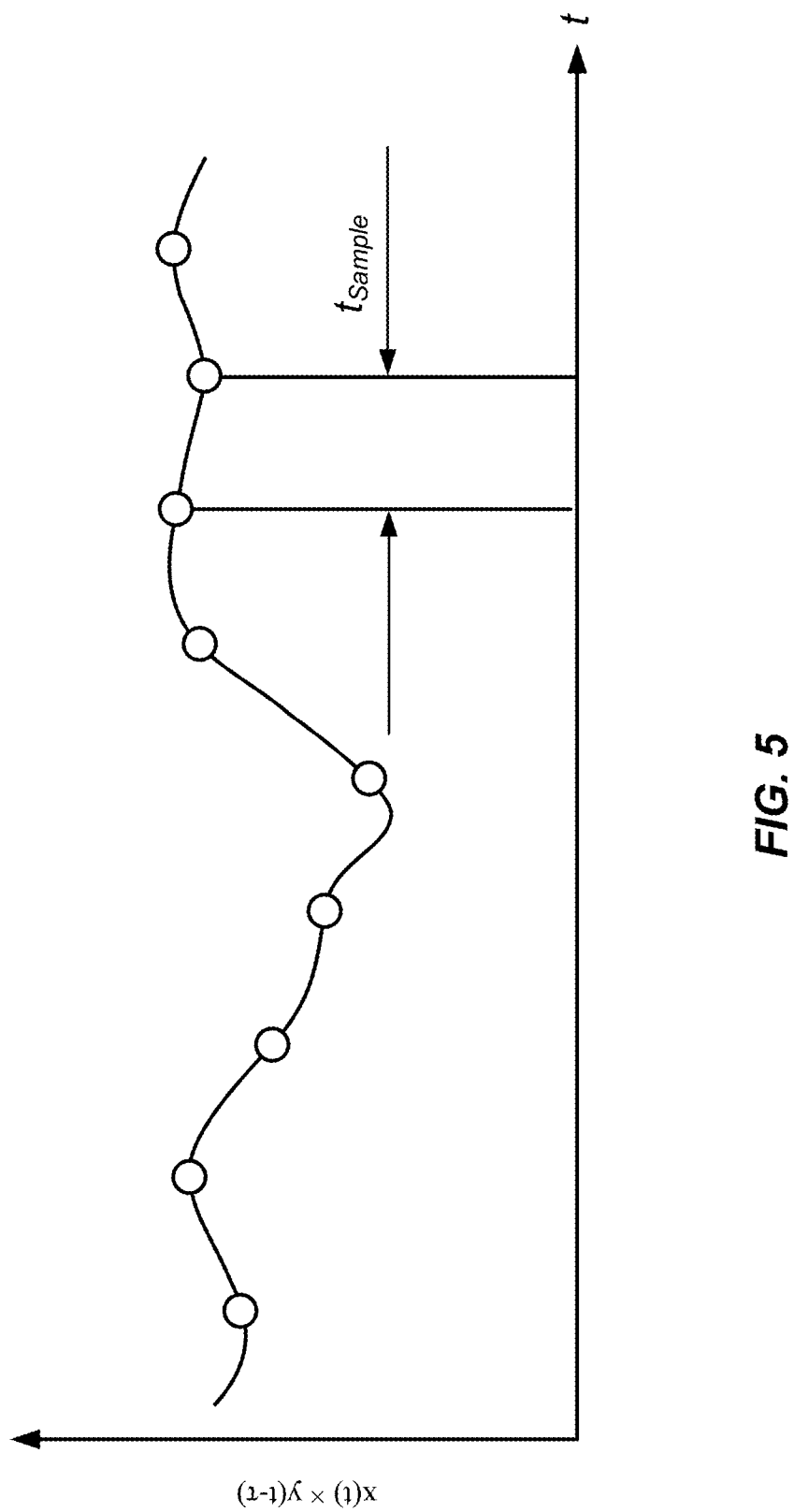
FIG. 5 is a plot illustrating the delayed product of the two RF inputs sampled by the ADC.

Referring to the notation seen in FIG. 3, the output of the balanced receiver 326 is sampled by the ADC 328 that converts the analog waveform (e.g., the delayed product of the first RF input y(t) received by the first antenna 302 and the second RF input x(t) received by the second antenna 304) to a set of sample data shown in FIG. 5.

FIG. 5 is a plot illustrating the delayed product of two RF inputs sampled by the ADC, for example ADC elements 128 or 129. The delayed product may be sampled by ADC elements of the embodiments described herein (e.g., the ADC elements 128 and 129 of FIG. 1 or the ADC elements 328 and 329 of FIG. 3). The ADC may sample at every $t_{sample}$ seconds, which may then be varied to change the accuracy with respect to the time of the delayed product measure.

Prior to the analog-to-digital conversion step, the CAF can also be acquired by integrating the delayed product (e.g., by the filtering element 122 illustrated in FIG. 1 or the backplane digital processor 130):

$$R_\alpha^T(T) = \int_{-T/2}^{T/2} x(t) \times y(t-\tau) e^{-j2\pi\alpha t} dt. \quad (4)$$

The equivalent result is achieved without a filter, in the discrete domain by recognizing that:

$$\int_{-T/2}^{T/2} x(t) y(t-\tau) e^{-j2\pi\alpha t} dt \to \Sigma_{k=1}^N x(k\delta t) y(\delta t-\tau) e^{-j2\pi\alpha k\delta t} \quad (5)$$

where $\delta t = t_{sample}$. Similarly, the Fourier transform at the left side of this relation has a corresponding equivalent in the discrete domain:

$$\int_{-\frac{T}{2}}^{\frac{T}{2}} x(t) y(t-\tau) e^{-j2\pi\alpha t} dt = F(x(t)y(t-\tau)) \to \quad (6)$$

$$\sum_{k=1}^{N} x(k\delta t) y(k\delta t - \tau) e^{-j2\pi\alpha k\delta t} = DFT(x(k\delta t)y(k\delta t - \tau))$$

where DFT refers to the discrete Fourier transform, ordinarily implemented via the Fast Fourier Transform (FFT) algorithm. This means that the CAF can be realized in the form of a table.

Figure 6:
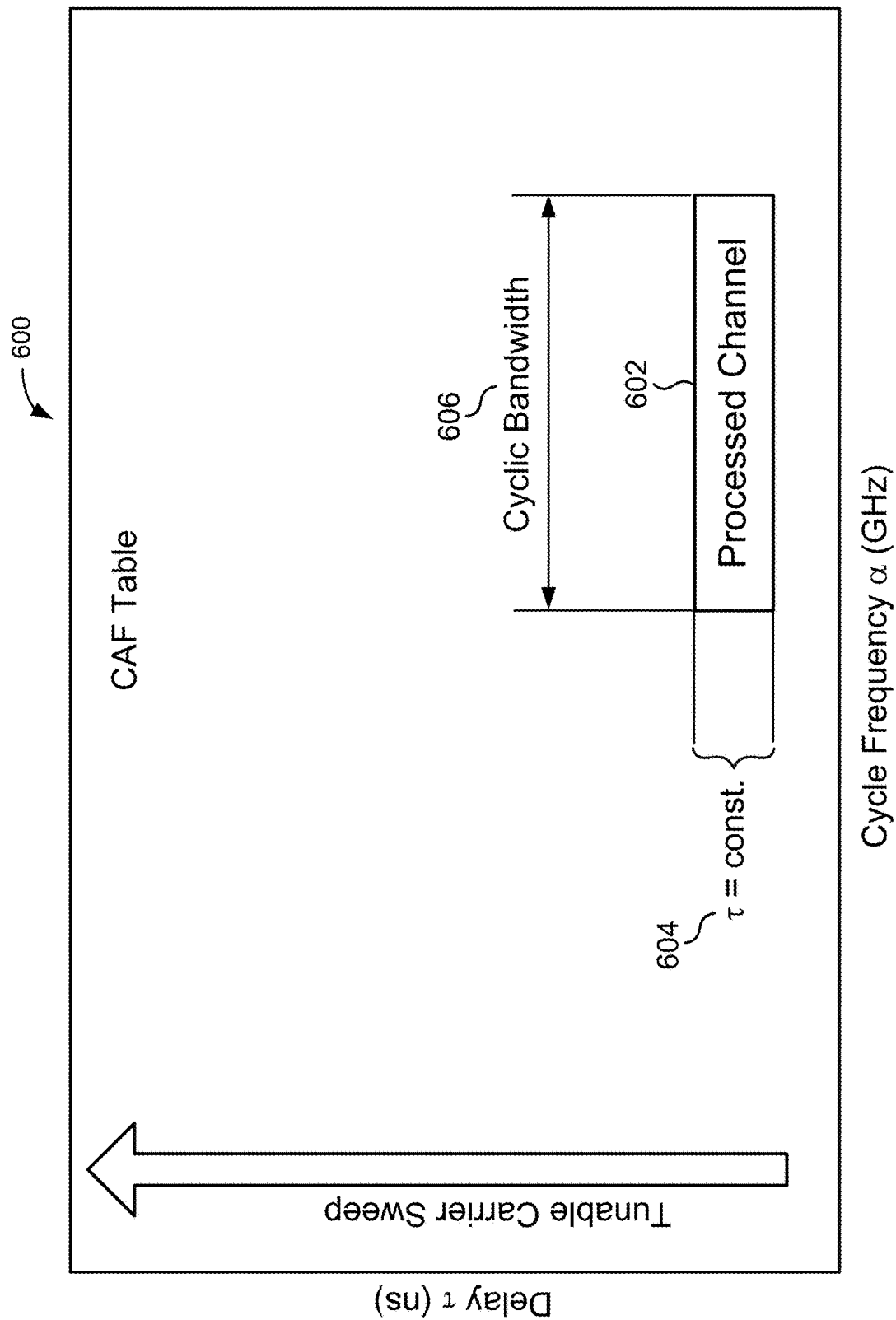
FIG. 6 is a cross-ambiguity function (CAF) realized as a table.

FIG. 6 is a CAF table 600 realized as a table. As illustrated in FIG. 6, for a selected wavelength of a tunable laser (e.g., the tunable laser 110), a specific value of the delay 604 (e.g., $\tau$ in FIG. 6 may be equivalent to the delay $\tau$ described with respect to FIG. 1) is defined. When the wavelength of the tunable laser is fixed at this selected wavelength, the delay product is acquired and the CAF value $C_\alpha^T(\tau)$ for the selected $\tau$ is generated at the output of the backplane processor (e.g., the backplane digital processor 130), indicated by the tile labeled as Processed Channel 602 in FIG. 6. The length of the CAF table segment, the cyclic bandwidth 606, is given by the bandwidth of the ADC circuit used to convert the analog delay product to the digital domain.

It should be noted that, for purposes of clarity, the delay 604 represented by $\tau$ is illustrated in FIG. 6 as having a finite dimension indicated by the parenthesis aligned with the ordinate axis (i.e., the y-axis representing the Delay $\tau$ in nanoseconds). However, it will be appreciated that this is merely for purposes of illustration and the processed channel 602 will be associated with a specific value of the delay 604 and a range of cycle frequencies given by the bandwidth of the ADC circuit used to convert the analog delay product to the digital domain. Accordingly, processed channel 602 could also be illustrated in FIG. 6 as a line extending over a range of cycle frequencies. Thus, as discussed more fully in relation to FIG. 7B, the delay $\tau$ is swept over a range of values by tuning the wavelength of the tunable laser, enabling formation of the CAF table.

Figure 7A:
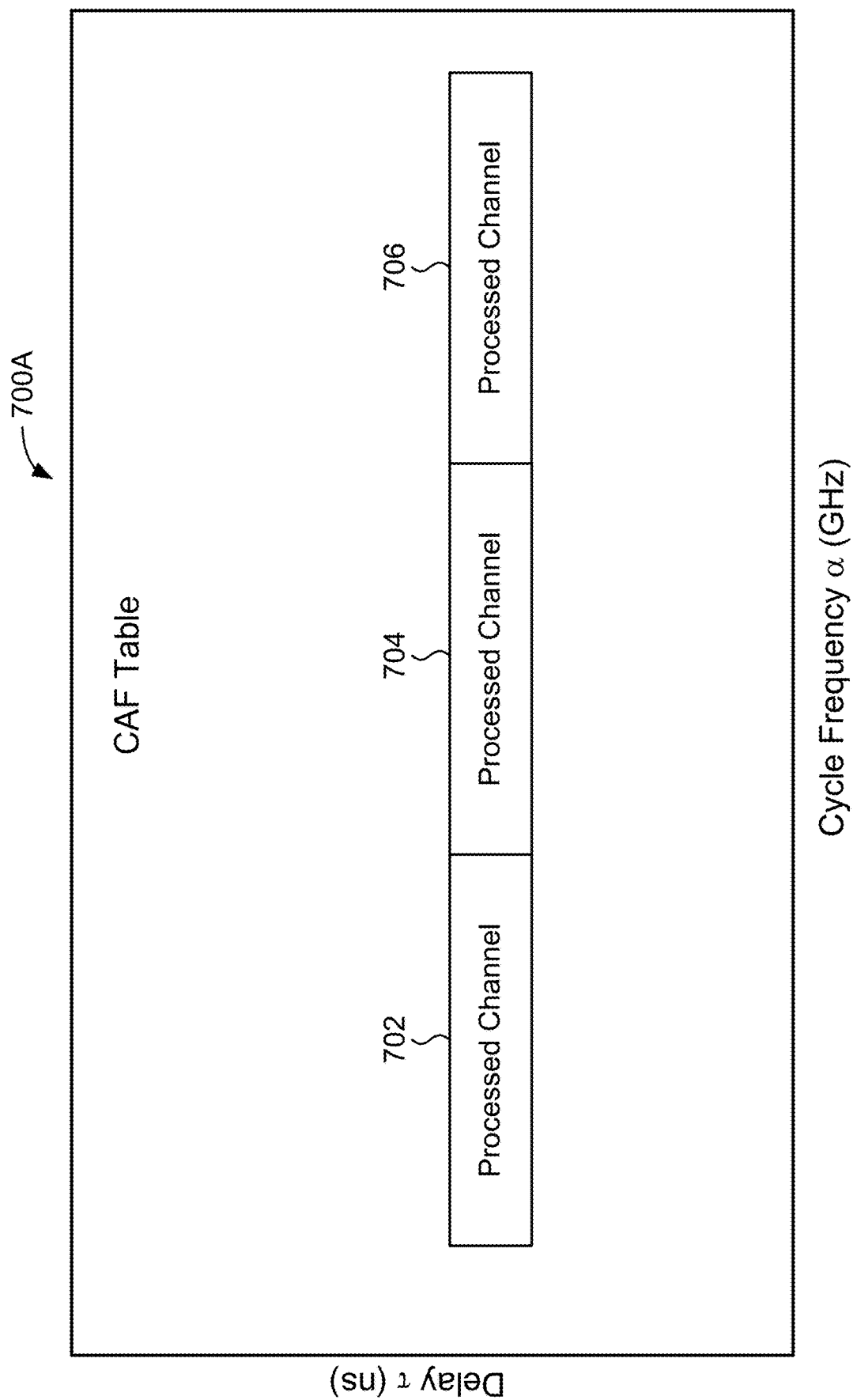
FIG. 7A is a plot of a CAF table generated by maintaining a constant delay $\tau$ and varying the cyclical frequency $\alpha$.

FIG. 7A shows a CAF table 700A generated by maintaining a constant delay $\tau$ and varying the cyclical frequency $\alpha$. The wavelength position of a tunable laser (e.g., the tunable laser 110) may be kept constant, while the frequency of the ADC circuit may be varied to process the complete signal. The frequency may be changed by use of a frequency shifter (e.g., the frequency shifter 150 in FIG. 1). As an example, the initial configuration may acquire a first processed channel 702. After acquisition of the first processed channel 702 is complete, the frequency of the ADC may be varied to acquire a second processed channel 704 or a third processed channel 706. This may be used when the bandwidth of the ADC circuit is not sufficiently large (e.g., as illustrated in FIG. 2B) to capture the desired spectral range.

Figure 7B:
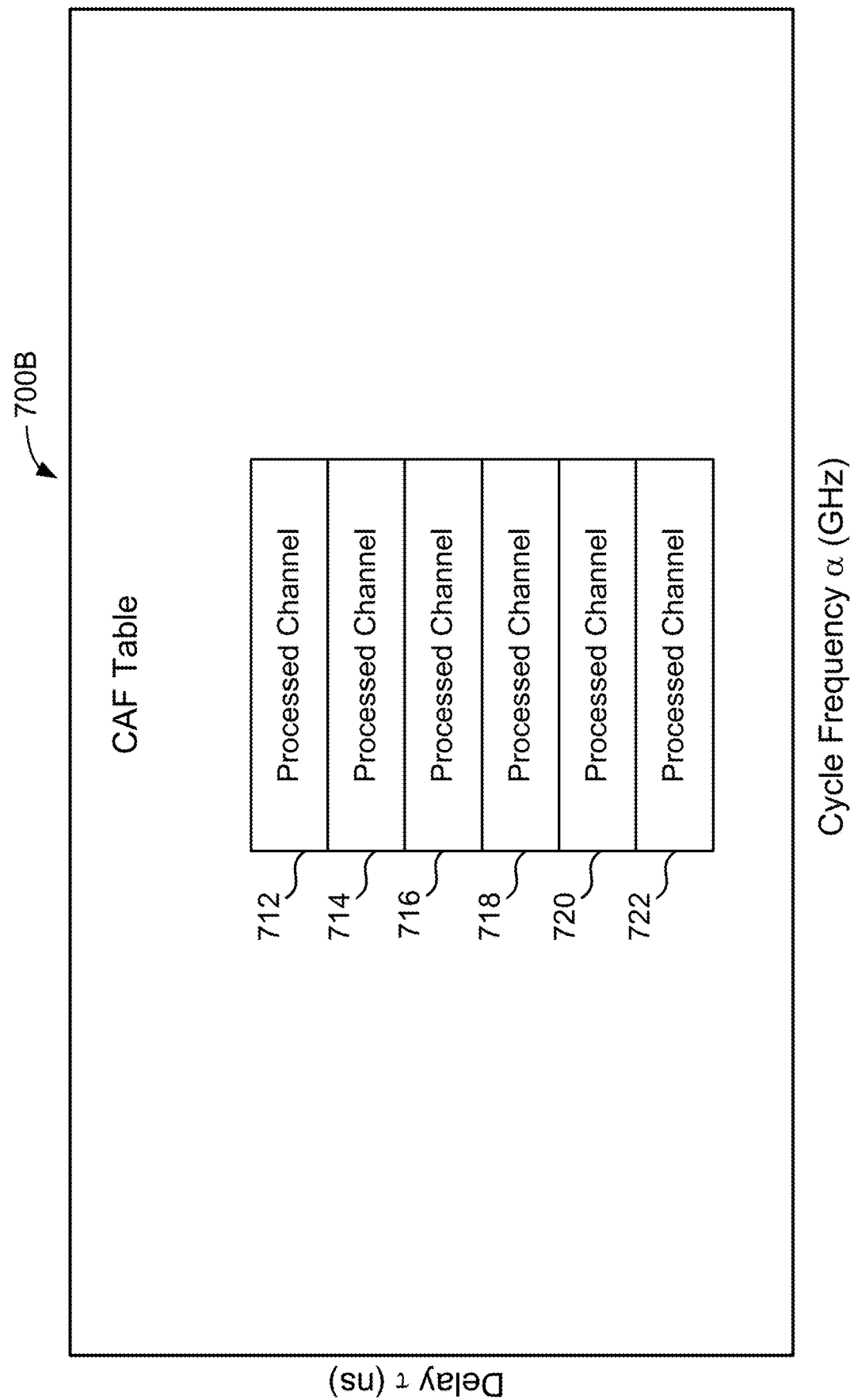
FIG. 7B is a plot of a CAF table generated by varying the delay $\tau$ and maintaining a cyclical frequency $\alpha$.

FIG. 7B shows a CAF table 700B generated by varying the delay $\tau$ and maintaining a cyclical frequency $\alpha$. The delay $\tau$ may be varied by tuning the wavelength position of a tunable laser (e.g., the tunable laser 110). A first processed channel 712 may be acquired with an initial wavelength position of a tunable laser. The wavelength position may then be varied to acquire a second processed channel 714, a third processed channel 716, a fourth processed channel 718, a fifth processed channel 720, and a sixth processed channel 722, etc. As discussed in relation to FIG. 6, the extent of the processed channels along the ordinate axis (Delay $\tau$) is merely for purposes of illustration and it will be appreciated that, in practice, the processed channels correspond to a set of lines extending over a range of cycle frequencies. One of ordinary skill in the art would recognize many variations, modifications, and alternatives.

In a general case, a CAF table is completed by the combination of both tiling strategies seen in FIG. 7A and FIG. 7B. Thus, in order to generate a CAF table that extends over a range of cyclic frequencies and a range of delay values, the methods of FIG. 7A and FIG. 7B may be used in combination. In practice, a CAF table can be generated by parallelizing the acquisition processes. To accomplish this, backplane circuits are added after a wavelength-division demultiplexer (WDM DMUX). The hybrid photonic-electronic processors seen in embodiments above may further accomplish this by replacing a single-wavelength carrier (e.g., the fixed-frequency laser 120 in FIG. 1, etc.) with a comb source (CS) possessing multiple, mutually coherent carriers.

Figure 8:
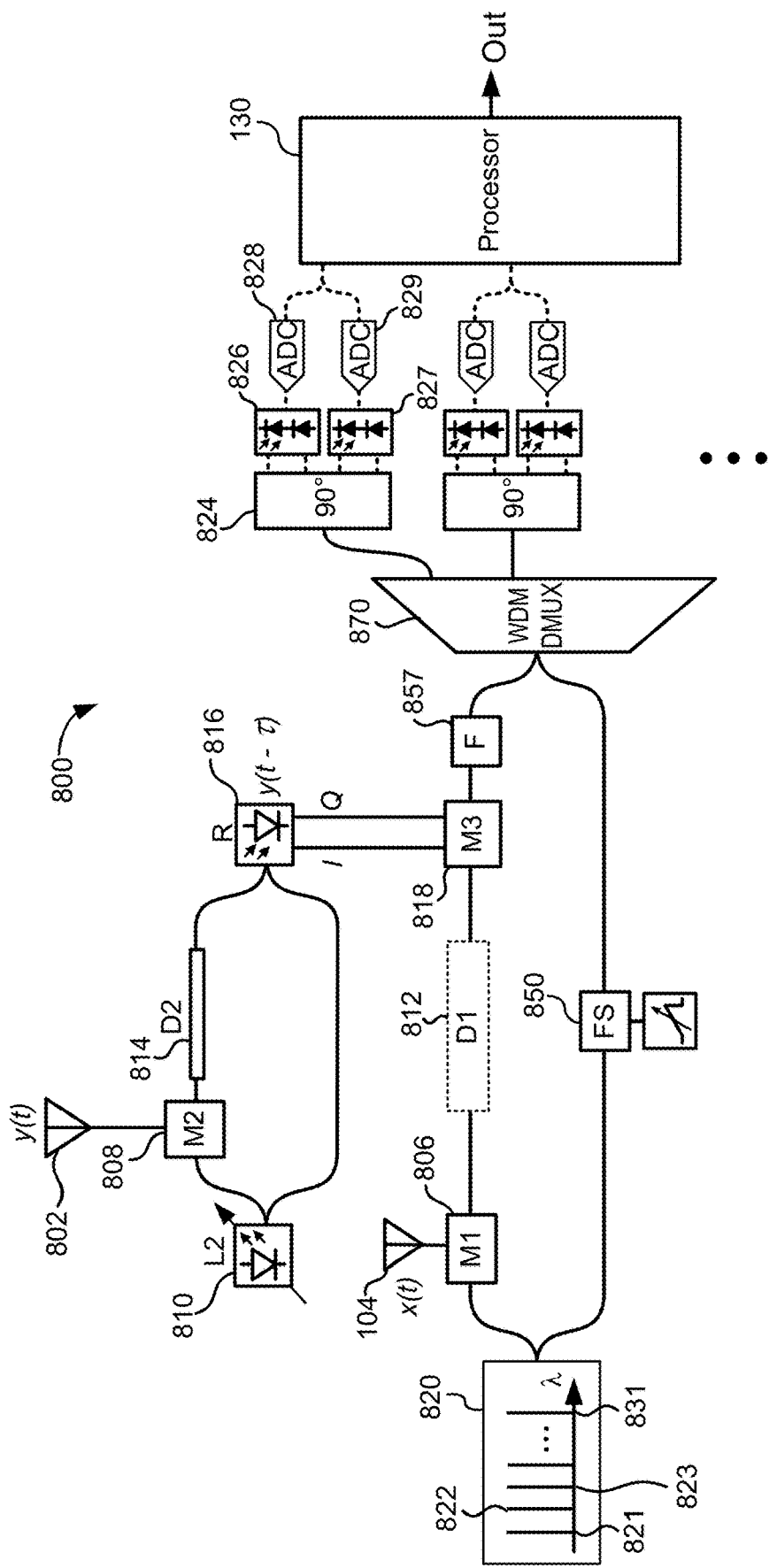
FIG. 8 is a simplified schematic diagram illustrating a hybrid photonic-electronic processor utilizing a parallelized acquisition system according to an embodiment of the present invention.

FIG. 8 is a simplified schematic diagram illustrating a hybrid photonic-electronic processor utilizing a parallelized acquisition system according to an embodiment of the present invention. The parallelized hybrid photonic-electronic processor 800 illustrated in FIG. 8 shares some common elements with the hybrid photonic-electronic processor 100 illustrated in FIG. 1 and the description provided in relation to FIG. 1 is applicable to FIG. 8 as appropriate.

Backplane circuits (e.g., a 90-degree hybrid 824, the corresponding set of balanced receivers 826 and 827, and the ADC elements 828 and 829) are added after a wavelength division demultiplexer (WDM DMUX) 870 such that CAF maps can be generated. The processor scaling is accomplished by replacing the single-wavelength carrier (e.g., the fixed-frequency laser 120 of FIG. 1) by a comb source 820 providing multiple, mutually coherent carriers 821, 822, 823, through 831, representing mutually coherent carriers 1 through n.

Each comb carrier of the mutually coherent carriers 821 through 831 is modulated via a similar optoelectronic modulator chain (e.g., the first optoelectronic modulator 806, the second optoelectronic modulator 808, and the third optoelectronic modulator 818) as discussed in previous embodiments and provided to a dedicated detector element 816 and backplane circuits via the WDM DMUX 870. As illustrated in FIG. 8, each of the frequency comb carriers (e.g., the first coherent carrier 821, the second coherent carrier 822, etc.), after modulation by first optoelectronic modulator 806, propagate through the first dispersive line 812 and experience a fixed delay $\Delta\tau$ between adjacent carriers as discussed more fully in relation to FIG. 9.

In one implementation, a CAF table can be filled using the process illustrated in FIG. 7A. This may be accomplished by fixing the wavelength of the tunable laser 810 and varying the frequency of the set of ADC elements 828, 829, etc. by passing various coherent carriers (e.g., a first coherent carrier 821, a second coherent carrier 822, etc.) from the comb source 820. In another implementation, a CAF table may be filled using the process illustrated in FIG. 7B through tuning of the tunable laser 810. In alternative implementations, the CAF table is completed by using both acquisition methods shown in FIG. 7A and FIG. 7B.

It should be noted that although second optoelectronic modulator 808, antenna 802, dispersive element 814, and coherent detector 816 producing both quadrature and phase (I/Q) output in order to drive a third coherent optoelectronic modulator 818 are utilized in FIG. 8, this is not required and elements utilized to provide the delayed signal y(t−τ) can be utilized, for example, as illustrated in FIG. 1. Additionally, filter 857 is optional. As discussed in relation to FIG. 1, the frequency shifter 850 may be configured to shift the frequencies provided by the comb source by an arbitrary amount.

Figure 9:
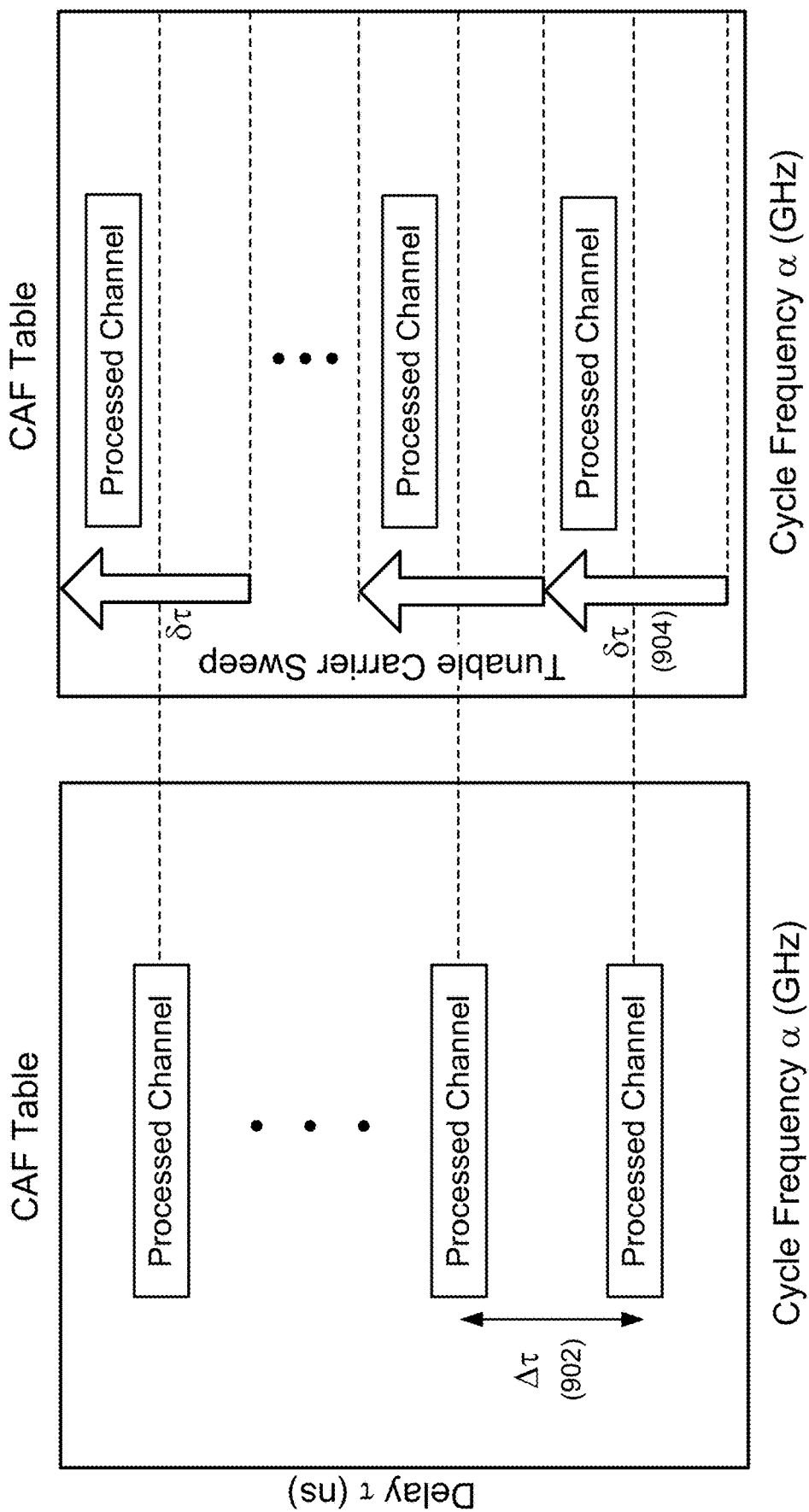
FIG. 9 is a plot showing CAF tables generated using a parallelized hybrid photonic-electronic processor

FIG. 9 is a plot showing CAF tables generated using a parallelized hybrid photonic-electronic processor. Frequency comb carriers (e.g., the first coherent carrier 821 in FIG. 8, etc.) experience a fixed delay $\Delta\tau$ between adjacent carriers after passing through a first dispersive element (e.g., the first dispersive line 812). This is equivalent to sampling multiple delay states of CAFs and acquiring $C_\alpha^T(\tau_k)$, where k=1,2,3, . . . n, where n is the total number of frequency comb carriers. The dispersion Di introduced by the first dispersive element (e.g., the first dispersive line 812) and frequency comb pitch $\Delta f$ (e.g., the spacing between the coherent carriers of CS 820) define the resolution of the delay sampling period (e.g., the fixed delay $\Delta\tau$). Any other delay value is acquired by tuning a tunable laser (e.g., the tunable laser 810) to sweep the tunable laser over a range of frequencies corresponding to sweep time Err 904. A complete coverage of delay ranges corresponds to $\Delta\tau=\delta t$, imposing a direct relation amongst dispersion elements, tunable laser wavelength tuning range, and comb carrier pitch $\Delta f$.

In some embodiments, the CAF table can be generated rapidly by sweeping the delay range in a continuous manner. In these embodiments, a tunable laser, rather than being operated at a fixed wavelength, i.e., occupying a fixed wavelength position, for the duration of the delay-product acquisition, is swept over a range of wavelengths as illustrated in FIG. 10.

Figure 10:
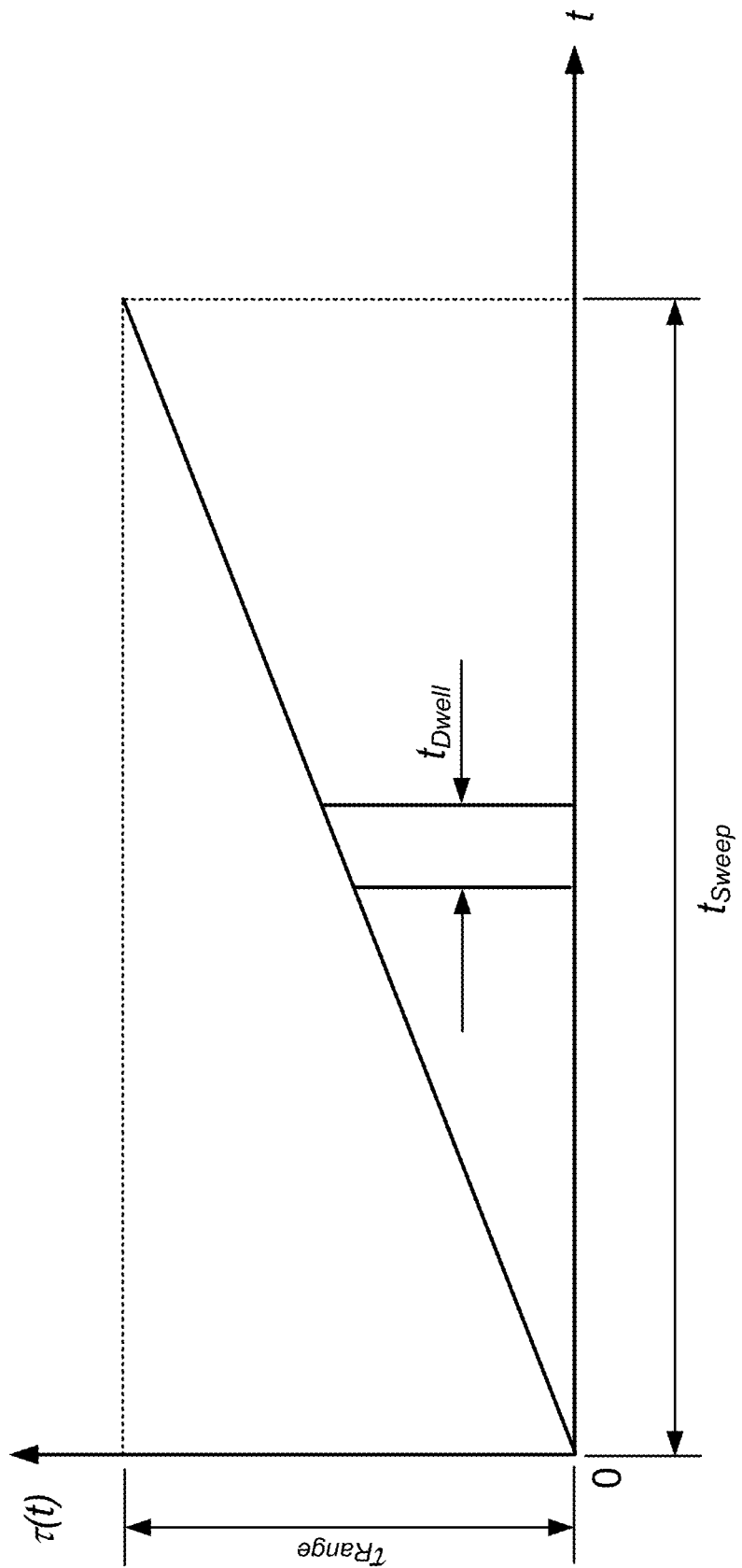
FIG. 10 is a plot showing the relation between the maximal delay range ($\tau_{RANGE}$) of a tunable laser, the time utilized to sweep the laser wavelength over the delay range ($t_{Sweep}$), and the time to acquire a single delay state ($\tau_{Dwell}$).

FIG. 10 is a plot showing the relation between the maximal delay range ($\tau_{RANGE}$) of a tunable laser, the time utilized to sweep the laser wavelength over the delay range ($t_{Sweep}$), and the time to acquire a single delay state ($t_{Dwell}$). During operation, the tunable laser is continuously tuned to provide delays over the maximal delay range $\tau_{RANGE}$. The instantaneous value of the delay τ(t) is defined by:

$$\tau(t) = D \times L \times \frac{\delta\lambda}{\delta t} \times t \qquad (7)$$

where D is the value of the dispersion measured in ps/km-nm, L is the length of the dispersive line in km, $$\frac{\delta\lambda}{\delta t}$$

is the rate of laser wavelength sweep in nm/sec, and t is the time measured in seconds.

Figure 11:
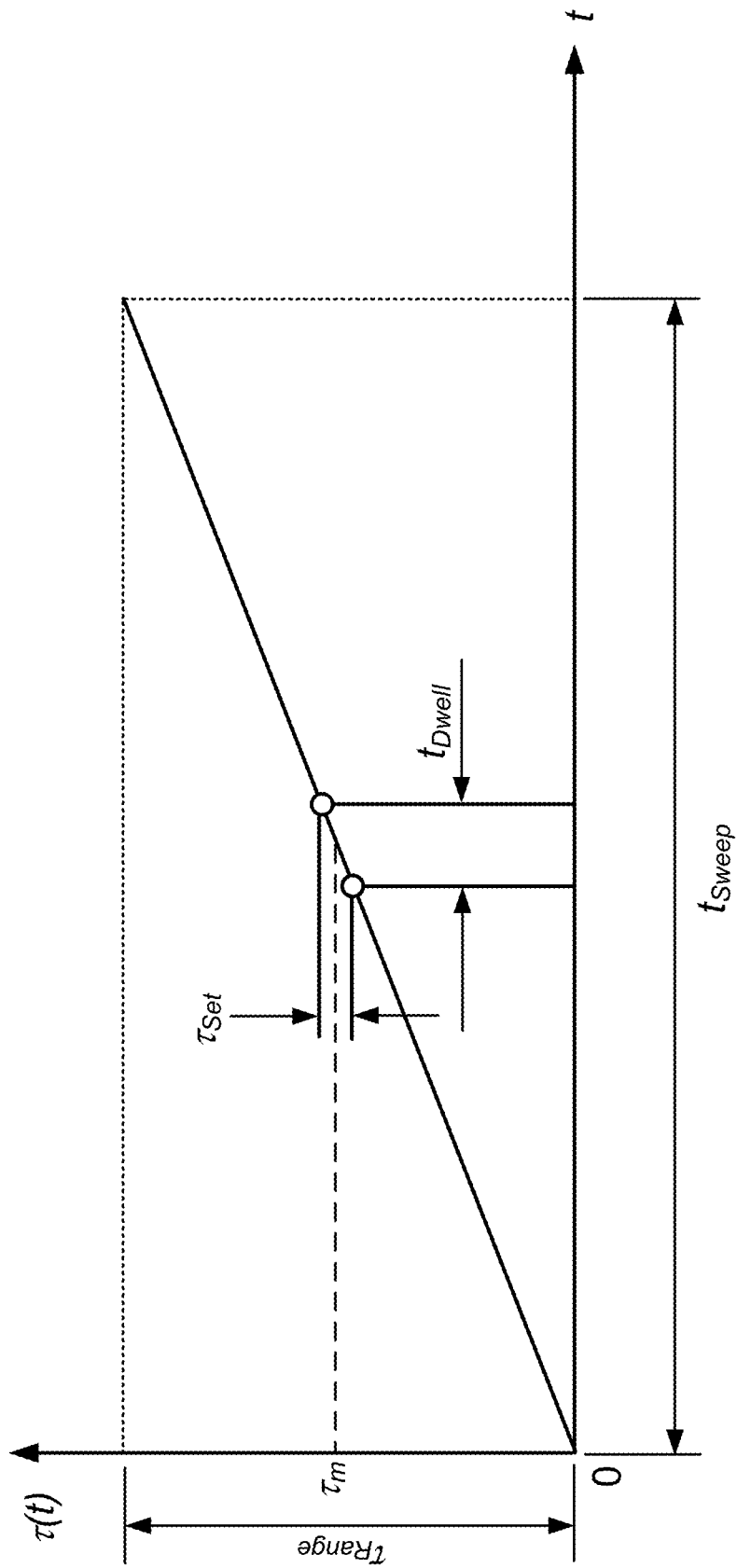
FIG. 11 is a plot showing the delay variation during acquisition time.

FIG. 11 is a plot showing the delay variation during acquisition time. The plot shows delay τ increasing as the tunable laser is swept over a range of wavelengths. Thus, the CAF table is generated (e.g., at the output of the backend processor 830) in the vertical acquisition scenario illustrated in FIG. 7B. If the dwell time used to acquire a single delay state $t_{Dwell}$ is small in comparison to the time utilized to sweep the laser wavelength over the delay range $t_{Sweep}$, then the slope of $\tau_{RANGE}$ to $t_{Sweep}$ can be considered as negligible, resulting in a substantially constant value for the delay τ. Accordingly, the delay values in the set of delays ($\tau_{set}$) is limited to a small value centered on $\tau_m$, representing the delay corresponding to the measurement.

Figure 12:
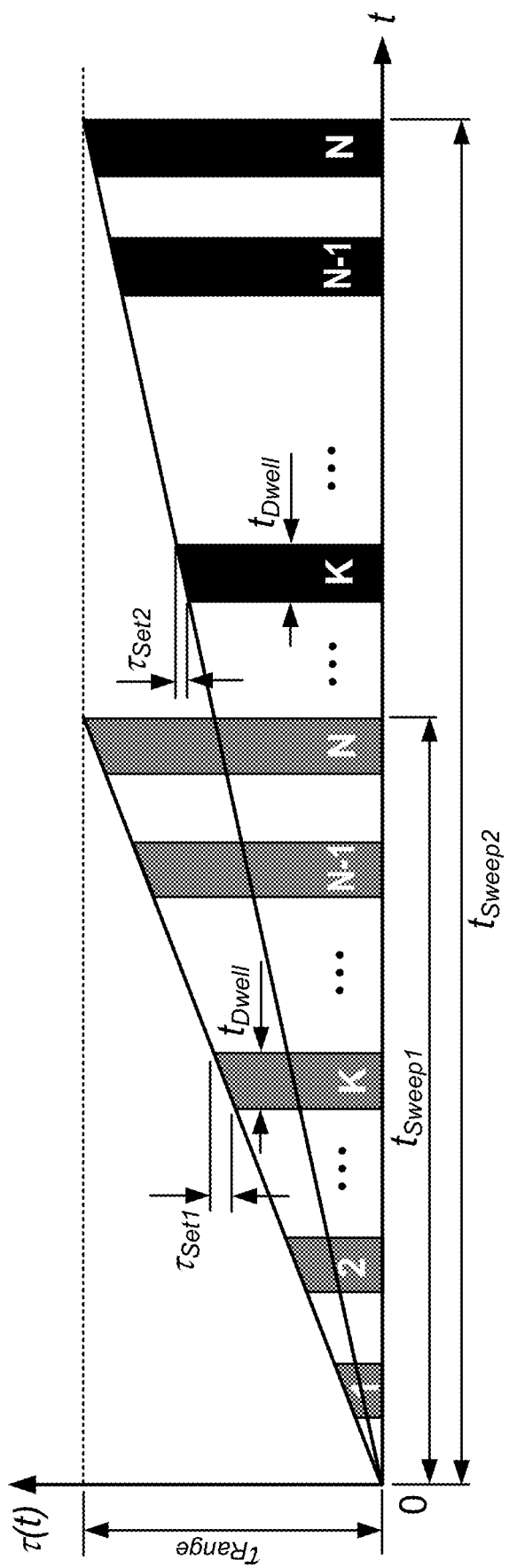
FIG. 12 is a plot illustrating constraints defined by the tunable laser sweep rate.

FIG. 12 is a plot illustrating constraints defined by the tunable laser sweep rate. As illustrated in FIG. 12, when the acquisition time is specified (e.g., $t_{Dwell}$ is constant) and the number of delay states in the CAF table are given as N, the variation in the laser sweep rate also mandates a change in the $\Delta\tau$ and $t_{Sweep}$. The plot shows a first sweep and second sweep with a constant $t_{Dwell}$ and where $t_{Sweep1} < t_{Sweep2}$. At the $k^{th}$ delay state in the first sweep, the change in the delay over the sweep time $t_{Sweep1}$ takes a first value $\tau_{set1}$. At the $k^{th}$ delay state in the second sweep, the change in the delay over the sweep time $t_{Sweep2}$ takes a second value $\tau_{set2}$. To maintain a constant $t_{Dwell}$, $\tau_{set1}$ is greater than $\tau_{set2}$.

The variance in the delay as a function of dwell time $t_{dwell}$ can be defined for a given laser sweep rate and acquisition time:

$$\tau_{set} = D \times L \times \frac{\delta\lambda}{\delta t} \times t_{Dwell} \qquad (8)$$

where $\tau_{set}$ is the change in delay over the dwell time, D is the dispersion of a dispersive element, and L is the length of the dispersive element. For a given gain expected from the CAF table, there is a uniquely defined $t_{Dwell}$ value. As an example, for a sweep rate of $\delta\lambda/\delta t$=2000 nm/s, dispersion of D=120 ps/km-nm and dispersion element length L=2 km and dwell time of $t_{Dwell}$=10 µs, the change in delay time during acquisition time is $\Delta\tau$=48×10$^{-8}$×10 µs=4.8 ps, mandating that any signal variation during the acquisition time remains slower than approximately 5 picoseconds. In practice, this condition is easily satisfied: signal bandwidth would need to exceed approximately 100 GHz to violate the limit imposed by the specific choice of parameters used in this case. Ultimately, the application (e.g., the nature of the signal inputs of the processors) will define an acceptable range of $\Delta\tau$.

Figure 13:
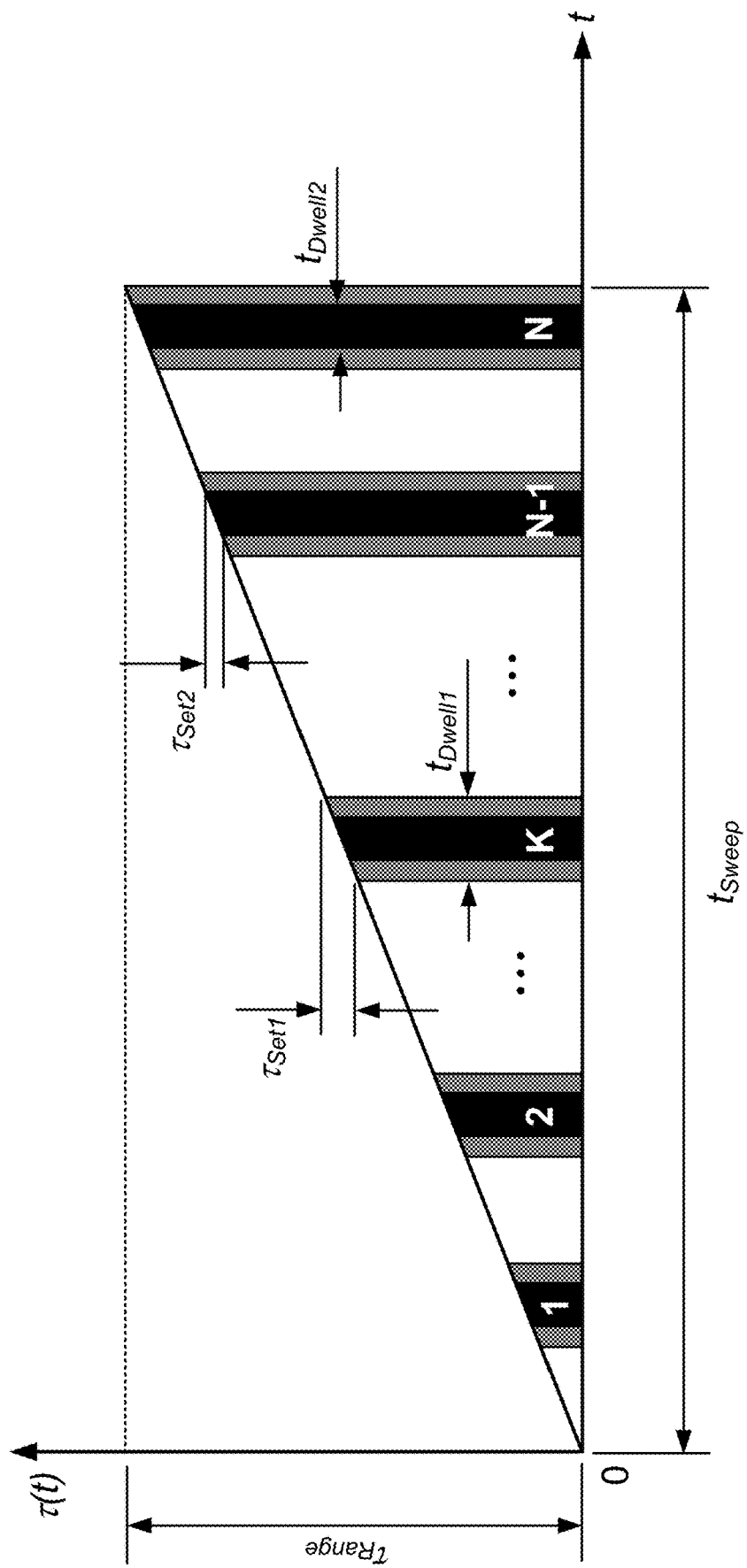
FIG. 13 is a plot illustrating two acquisition conditions in which the sweep time of the tunable laser is constant and the measurement periods differ.

FIG. 13 is a plot illustrating two acquisition conditions in which the sweep time of the tunable laser is constant and the measurement periods differ. In FIG. 13, the laser sweep rate is equal in both acquisition conditions, i.e., $t_{Sweep}$ is constant. For the first acquisition condition, the measurement time is set at $t_{Dwell1}$. In this case, given a measurement time of $t_{Dwell1}$, the change in the delay over the sweep time $t_{Sweep1}$ is a first value $\tau_{set1}$. For the second acquisition condition, the measurement time is decreased to $t_{Dwell2}$. In this second case, given the reduced measurement time of $t_{Dwell2}$, the change in the delay over the sweep time $t_{Sweep1}$ is reduced to a second value $\tau_{set2}$. Thus, shorter measurement times will produce decreased changes in delay during a measurement.

Thus, considering FIGS. 12 and 13, an increase in the sweep time will reduce the changes in delay during a measurement (FIG. 12) and a decrease in the measurement time will reduce the changes in delay during a measurement (FIG. 13). One of ordinary skill in the art would recognize many variations, modifications, and alternatives.

Physical parameters described above are interdependent and define multiple operating regimes of the processor. An example of a regime is given. A controller may assist a user with operation of the processor through the use of controls. A user selects the desired range over which the delay time is to be varied: a control algorithm may convert this parameter to tunable laser wavelength start and stop values, defining the $\tau_{Range}$ parameter (e.g., the user chooses −15 ps to +15 ps; the control algorithm may then instruct the laser being swept in wavelength to sweep from 1500 nm-1580 nm). The user selects $\tau$ resolution: the control may then calculate an amount of $\tau$ bins it has to cover (e.g., 300 $\tau$ bins for 0.1 ps resolution over a 30 ps range). The user selects alpha resolution or processing gain: the controller may convert this to dwell time $t_{Dwell}$ and calculates how many samples N to collect during $t_{Dwell}$ (e.g., for a dwell time of 10 ms, 2500 samples at a sampling rate of 250 MHz can be utilized). The control algorithm calculates the total measurement time and the laser sweep speed: laser sweep speed $$\frac{\delta\lambda}{\delta t} = \Delta\tau/(t_{Dwell} \times N)$$

(e.g., 80 nm/(10 ms×300)=26,666 nm/s is greater than a maximum laser sweep speed (~2500 nm/s)). The controller may accommodate by applying the maximum laser sweep speed and maintaining $t_{Dwell}$, supplying only 300 points out of 4000 collected. Alternatively, the user is invited to select a higher delay resolution, to integrate longer, or switch the change in dispersive length.

Figure 14:
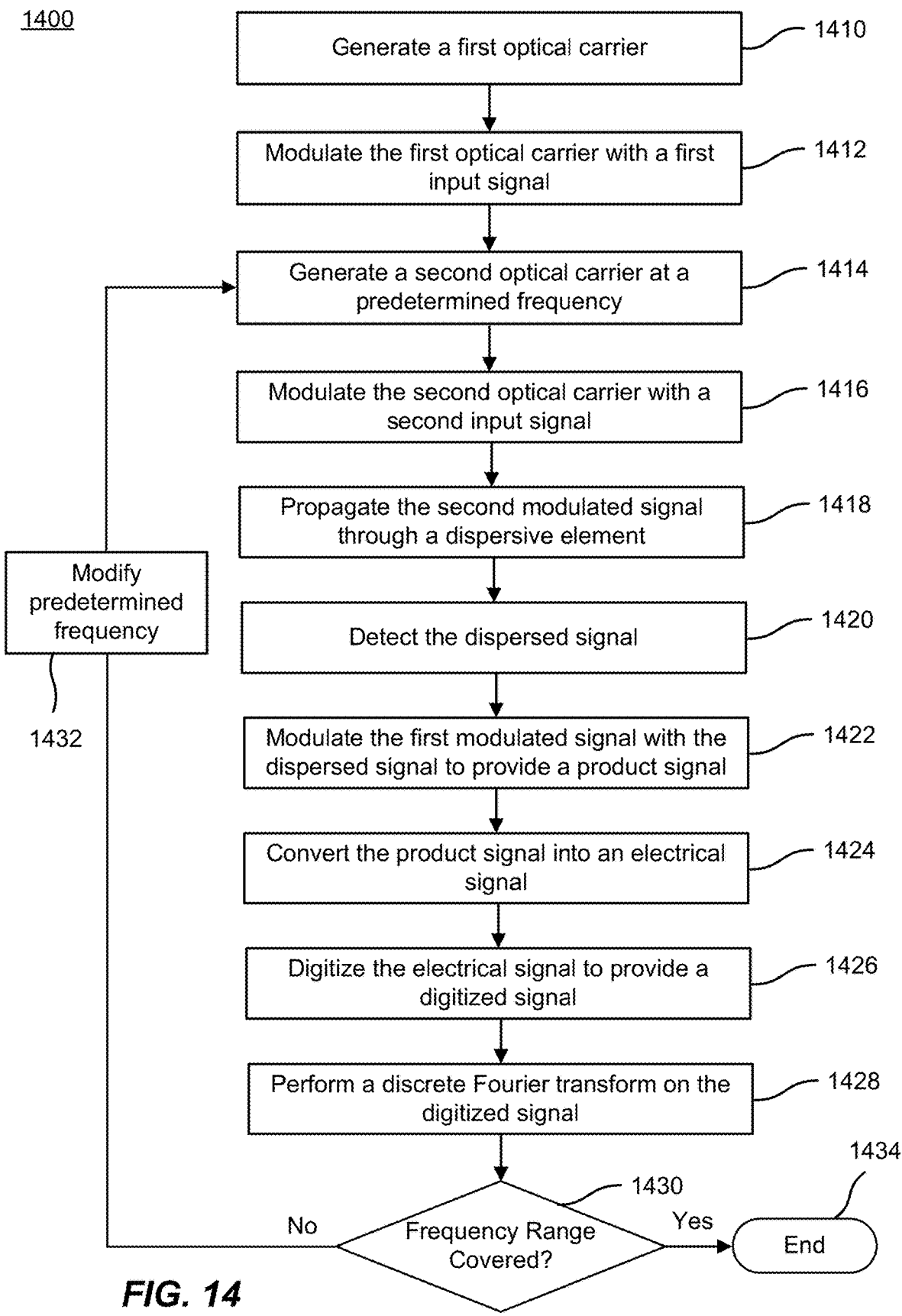
FIG. 14 is a simplified flowchart illustrating a method of generating a cross-ambiguity function (CAF) table according to an embodiment of the present invention.

FIG. 14 is a simplified flowchart illustrating a method of generating a cross-ambiguity function (CAF) table according to an embodiment of the present invention. The method 1400 includes a) generating a first optical carrier (1410) and b) modulating the first optical carrier with a first input signal of a set of input signals to provide a first modulated signal (1412). The first optical carrier can be a fixed wavelength optical carrier. Modulating the first optical carrier can include the use of a single-sideband modulator, a dual-port Mach-Zehnder modulator, or a dual-port, nested Mach-Zehnder device. The method also includes c) generating a second optical carrier at a predetermined frequency $f_i$ (1414), d) modulating the tunable optical carrier with a second input signal of the set of input signals to provide a second modulated signal (1416), e) propagating the second modulated signal through a dispersive element to provide a dispersed signal (1418), and f) detecting the dispersed signal (1420).

The method further includes g) modulating the first modulated signal with the dispersed signal to provide a product signal (1422), h) converting the product signal into an electrical signal (1424), i) digitizing the electrical signal to provide a digitized signal (1426), and j) performing a discrete Fourier transform on the digitized signal (1428). In some embodiments, the product signal is filtered prior to converting the product signal into an electrical signal. In this case, the filtered product signal is converted into an electrical signal at step 1424. A determination is made with respect to whether a desired frequency range between a first frequency $f_1$ and a second frequency $f_2$ has been covered (1430). If not, then the predetermined frequency is modified (1432) and steps c) through j) are performed in an iterative manner until the range of frequencies $f_1 < f_i < f_2$ has been covered. Once the range has been covered, then the method ends (1434).

In some embodiments, the method also includes k) converting the first optical carrier into a second electrical signal, l) digitizing the second electrical signal to provide a second digitized signal, and m) performing a discrete Fourier transform on the second digitized signal. The method can also include shifting the first optical carrier to a shifted frequency, performing b) through j) as discussed above, and iteratively performing c) through j) over the range of frequencies $f_1 < f_i < f_2$.

It should be appreciated that the specific steps illustrated in FIG. 14 provide a particular method of generating a CAF table according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

One of ordinary skill in the art will appreciate that other modifications to the apparatuses and methods of the present disclosure may be made for implementing various applications of the hybrid photonic-electronic processor without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims which follow.

What is claimed is:

1. An apparatus comprising:
first and second optical modulators configured to respectively modulate first and second optical carriers and generate first and second modulated optical carriers;
a first dispersive element configured to delay the second modulated optical carrier and generate a delayed second modulated optical carrier;
a first optical detector configured to convert the delayed second modulated optical carrier into a first electrical signal;
a third optical modulator configured to modulate the first modulated optical carrier based on the first electrical signal and generate a third modulated optical carrier; and
an optical 90-degree hybrid element configured to separate the third modulated optical carrier into orthogonal components.

2. The apparatus of claim 1, further comprising:
second optical detectors configured to convert the orthogonal components into second electrical signals.

3. The apparatus of claim 2, further comprising:
analog-to-digital converters configured to digitize the second electrical signals; and
a processor configured to perform a discrete Fourier transform using outputs of the analog-to-digital converters.

4. The apparatus of claim 1, further comprising:
an optical filter configured to integrate the third modulated optical carrier and generate an integrated third modulated optical carrier;
wherein the optical 90-degree hybrid element is configured to receive the integrated third modulated optical carrier.

5. The apparatus of claim 1, further comprising:
a second dispersive element configured to delay the first modulated optical carrier and generate a delayed first modulated optical carrier;
wherein the third optical modulator is configured to receive and modulate the delayed first modulated optical carrier based on the first electrical signal.

6. The apparatus of claim 1, further comprising:
a fixed-frequency laser configured to generate the first optical carrier; and
a tunable laser configured to generate the second optical carrier.

7. The apparatus of claim 1, further comprising:
a laser configured to generate a laser output;
wherein a first portion of the laser output forms the first optical carrier;
wherein a frequency shifter is configured to receive a second portion of the laser output, shift a frequency of the second portion of the laser output, and generate a frequency-shifted portion of the laser output; and
wherein the optical 90-degree hybrid element is configured to receive the frequency-shifted portion of the laser output.

8. The apparatus of claim 1, further comprising:
a first antenna configured to provide a first input signal to the first optical modulator, the first optical modulator configured to modulate the first optical carrier based on the first input signal; and
a second antenna configured to provide a second input signal to the second optical modulator, the second optical modulator configured to modulate the second optical carrier based on the second input signal.

9. An apparatus comprising:
first and second optical modulators configured to respectively modulate first optical carriers and a second optical carrier and generate first modulated optical carriers and a second modulated optical carrier;
a first dispersive element configured to delay the second modulated optical carrier and generate a delayed second modulated optical carrier;
a first optical detector configured to convert the delayed second modulated optical carrier into a first electrical signal;
a third optical modulator configured to modulate the first modulated optical carriers based on the first electrical signal and generate third modulated optical carriers;
a wavelength-division demultiplexer coupled to the third optical modulator; and
multiple optical 90-degree hybrid elements configured to separate the third modulated optical carriers into orthogonal components.

10. The apparatus of claim 9, further comprising:
for each optical 90-degree hybrid element, second optical detectors configured to convert the orthogonal components from the optical 90-degree hybrid element into second electrical signals.

11. The apparatus of claim 10, further comprising:
for each optical 90-degree hybrid element, analog-to-digital converters configured to digitize the second electrical signals; and
a processor configured to perform a discrete Fourier transform using outputs of the analog-to-digital converters.

12. The apparatus of claim 9, further comprising:
an optical filter configured to integrate the third modulated optical carriers and generate integrated third modulated optical carriers;
wherein the optical 90-degree hybrid elements are configured to receive the integrated third modulated optical carriers.

13. The apparatus of claim 9, further comprising:
a second dispersive element configured to delay the first modulated optical carriers and generate delayed first modulated optical carriers;
wherein the third optical modulator is configured to receive and modulate the delayed first modulated optical carriers based on the first electrical signal.

14. The apparatus of claim 9, further comprising:
a comb source configured to generate the first optical carriers; and
a tunable laser configured to generate the second optical carrier.

15. The apparatus of claim 9, further comprising:
a comb source configured to generate mutually-coherent carriers having different frequencies;
wherein first portions of the mutually-coherent carriers form the first optical carriers;
wherein a frequency shifter is configured to receive second portions of the mutually-coherent carriers, shift the frequencies of the second portions of the mutually-coherent carriers, and generate frequency-shifted portions of the mutually-coherent carriers; and wherein the optical 90-degree hybrid elements are configured to receive the frequency-shifted portions of the mutually-coherent carriers.

16. The apparatus of claim 9, further comprising:

a first antenna configured to provide a first input signal to the first optical modulator, the first optical modulator configured to modulate the first optical carriers based on the first input signal; and a second antenna configured to provide a second input signal to the second optical modulator, the second optical modulator configured to modulate the second optical carrier based on the second input signal.

17. A method comprising:

modulating at least one first optical carrier and a second optical carrier to generate at least one first modulated optical carrier and a second modulated optical carrier;

delaying the second modulated optical carrier to generate a delayed second modulated optical carrier;

converting the delayed second modulated optical carrier into a first electrical signal;

modulating the at least one first modulated optical carrier based on the first electrical signal to generate at least one third modulated optical carrier; and separating the at least one third modulated optical carrier into orthogonal components.

18. The method of claim 17, further comprising:

converting the orthogonal components into second electrical signals;

digitizing the second electrical signals; and performing a discrete Fourier transform using the digitized second electrical signals.

19. The method of claim 17, further comprising:

generating a laser output;

splitting the laser output into a first portion and a second portion;

providing the first portion of the laser output as the at least one first optical carrier; and shifting a frequency of the second portion of the laser output to generate a frequency-shifted portion of the laser output, wherein separating the at least one third modulated optical carrier into the orthogonal components is based on the frequency-shifted portion of the laser output.

20. The method of claim 17, further comprising:

generating a frequency comb comprising mutually-coherent carriers having different frequencies;

splitting the frequency comb into a first portion and a second portion;

providing the first portion of the frequency comb as the at least one first optical carrier; and shifting frequencies of the second portion of the frequency comb to generate frequency-shifted portions of the mutually-coherent carriers, wherein separating the at least one third modulated optical carrier into the orthogonal components is based on the frequency-shifted portions of the mutually-coherent carriers.

* * * * *